US008634119B2

(12) United States Patent
Bablumyan et al.

(10) Patent No.: US 8,634,119 B2
(45) Date of Patent: Jan. 21, 2014

(54) SYSTEM FOR HOLOGRAPHY

(75) Inventors: Arkady Bablumyan, San Diego, CA (US); Pierre-Alexandre Jean Blanche, Tucson, AZ (US); Nasser N. Peyghambarian, Tucson, AZ (US)

(73) Assignee: TIPD, LLC, Tucson, AZ (US)

( * ) Notice: Subject to any disclaimer, the term of this patent is extended or adjusted under 35 U.S.C. 154(b) by 410 days.

(21) Appl. No.: 13/041,407

(22) Filed: Mar. 6, 2011

(65) Prior Publication Data

US 2012/0008482 A1    Jan. 12, 2012

Related U.S. Application Data

(60) Provisional application No. 61/363,165, filed on Jul. 9, 2010.

(51) Int. Cl.
*G03H 1/12* (2006.01)
*G11B 7/0065* (2006.01)
*G03H 1/00* (2006.01)
*G03H 1/26* (2006.01)

(52) U.S. Cl.
CPC ............ *G11B 7/0065* (2013.01); *G03H 1/0011* (2013.01); *G03H 1/26* (2013.01)
USPC .................................. 359/11; 359/3; 359/30

(58) Field of Classification Search
USPC ................. 359/1–35, 237–325, 902; 430/1–2
See application file for complete search history.

(56) References Cited

U.S. PATENT DOCUMENTS

| 5,064,264 | A | 11/1991 | Ducharme et al. |
| 5,569,565 | A | 10/1996 | Kawakami et al. |
| 6,281,994 | B1 | 8/2001 | Horikoshi et al. |
| 6,806,982 | B2 | 10/2004 | Newswanger |
| 6,859,293 | B2 | 2/2005 | Klug et al. |
| 7,027,197 | B2 | 4/2006 | Newswanger |
| 7,227,674 | B2 | 6/2007 | Klug et al. |
| 7,505,186 | B2 | 3/2009 | Newswanger |
| 2003/0156309 | A1* | 8/2003 | Zgonik ............................ 359/21 |
| 2009/0168129 | A1* | 7/2009 | Raguin et al. .................... 359/12 |

FOREIGN PATENT DOCUMENTS

WO    01/45943 A2    6/2001

OTHER PUBLICATIONS

Oksana Ostroverkhova et al, Organic Photorefractives: Mechanisms, Materials and Applications, Chem Rev. 104, 3267-3314 Jun. 26, 2004.
Tay et al., "An updatable holographic three-dimensional display," 2008 Nature Publishing Group, vol. 451, Feb. 7, 2008, pp. 694-698.
Peyghambarian et al., "Rewritable Holographic 3D Displays," OPN Jul./Aug. 2008, pp. 23-27.
Blanche et al., "An Updatable Holographic Display for 3D Visualization," Journal of Display Technology, vol. 4, No. 4, Dec. 2008, pp. 424-430.

(Continued)

*Primary Examiner* — Stephone B Allen
*Assistant Examiner* — Jeffrey Madonna
(74) *Attorney, Agent, or Firm* — Eric A. Gifford

(57) ABSTRACT

The present invention provides systems of recording holograms that reduce the writing time, increase the diffraction efficiency, improve the resolution, or restitute color. These systems are well suited for use with an updateable 3D holographic display using integral holography and photorefractive polymer.

14 Claims, 21 Drawing Sheets

(56) References Cited

OTHER PUBLICATIONS

Blanche et al., "Holographic three-dimensional telepresence using large-area photorefractive polymer," 80 Nature, vol. 468, Nov. 4, 2010.

Hayasaki et al., "Thick photorefractive polymer device with coplanar electrodes," Review of Scientific Instruments, vol. 74, No. 8, Aug. 2003, pp. 3693-3696.

* cited by examiner

SYSTEM FOR HOLOGRAPHY

CROSS-REFERENCE TO RELATED APPLICATIONS

This application claims benefit of priority under 35 U.S.C. 119(e) to U.S. Provisional Application No. 61/363,165 entitled "System and Method for Holography" and filed on Jul. 9, 2010, the entire contents of which are incorporated by reference.

GOVERNMENT LICENSE RIGHTS

This invention was made with Government support under contracts FA9550-10-C-0009 awarded by the Air Force Research Laboratory (AFRL), W31P4Q-07-C-0267 awarded by the U.S. Army Aviation & Missile Command and FA8650-10-C-7034 awarded by the Office of the Director of National Intelligence (ODNI). The Government has certain rights in this invention.

BACKGROUND OF THE INVENTION

1. Field of the Invention

This invention relates to recording holograms and, more particularly, to methods and techniques to improve the quality, recording speed, efficiency and color displaying of holograms. These methods may find particular applications with photorefractive polymers or other holographic recording materials for integral holographic 3D display and other applications.

2. Description of the Related Art

Holography is a technique that allows the light scattered from an object to be recorded and later reconstructed so that the object appears as if the object is in the same position relative to the recording medium as it was when recorded. Alternately, holograms can be computer generated by calculating the modulation pattern that would have been formed if beams with certain characteristics (wave front, intensity) had crossed each other. The calculated pattern is next transferred to a medium to make the actual hologram. The image changes as the position and orientation of the viewing system change in exactly the same way is if the object were still present, thus making the recorded image (hologram) appears three-dimensional. The technique of holography can also be used to optically store, retrieve, and process information (data storage); or to generate a particular wavefront (holographic optical element "HOE"). An HOE is an optical lens or lenses that converts an incoming wavefront to another wavefront using the diffraction principle. While holography is commonly used to display static 3-D pictures and simple 3D images have been successfully rendered, the generation of arbitrary scenes by a holographic display is not yet possible.

As shown in FIG. 1, when two coherent optical beams e.g. a reference beam 10 and an object beam 12 of finite beam width cross each other at a point in space, they interfere. The phase difference between the beams at each spatial location in the plane defined by the bisector of the vectors formed by the two beams defines the intensity pattern. The recording of this intensity variation into a medium 14 as a phase and/or intensity modulation results in the formation of a hologram 16. The object beam may be scattered from the object or modulated based on computer-generated images to produce a 3D image. Typical media include, photothermoplastics, photopolymers, photochromics, silver halide, plates or films, and photorefractive (PR) polymers and crystals.

There exist two types of geometries for recording holograms, transmission and reflection. The geometry strongly influences the properties of the hologram and the way the hologram should be replayed. FIG. 1 illustrates the so-called transmission geometry where the recording beams 12 and 10 are incident on the same side of the holographic storing medium 14. In FIG. 2, recording beams 50 and 52 are incident from opposite sides of the holographic storing medium 54. This is the reflection geometry.

As shown in FIG. 3, when a light beam 60 is directed at the appropriate incident angle to read a transmission hologram 66, the diffracted beam 62 emerges from the opposite side of the material 64. In the case reading beam 60 contains different wavelengths, the diffracted beams 62 and 68 exit the media 64 at different angles and with different diffraction efficiency according to the hologram characteristics.

As shown in FIG. 4, when a light beam 70 is directed at the appropriate incident angle to read a reflection hologram 76, the diffracted beam 72 is diffracted to the same side of the material 74. In the case reading beam 70 contains different wavelengths, the diffracted beams 72 and 78 exit the media 74 at different angles. Moreover, if the reading beam 70 has a different wavelength from the writing beam used to record the hologram, the diffracted intensity is strongly attenuated (Bragg regime hologram). This is referred to as color selectivity.

Photorefractive Polymer Material

PR polymers are dynamic holographic recording materials. As shown in FIG. 5, an embodiment of a recording device 20 includes a layer of PR polymer material 22 sandwiched between a ground electrode 24 on an electrode support 26 and a high-voltage electrode 28 on an electrode support 30. A high-voltage power supply 32 applies a voltage between ground electrode 24 and high-voltage electrode 28 to provide a bias electric field 34 across the PR polymer.

As shown in FIG. 6, in PR polymers, a three-dimensional refractive index pattern—a phase hologram 40 replicates the non-uniform interference pattern 42 formed by the two incident coherent light fields 44 and 46. This effect is based on the build-up of an internal space-charge field $E_s$ 48 due to selective transport and trapping of the photo-generated charges 50, and an electric field induced index change via the electro-optic effect. This process—in contrast to photochemical processes involved in photopolymer holograms—is fully reversible, as trapped charges can be de-trapped by uniform illumination. The erasability of the PR gratings allows for refreshing/updating of the holograms. In a typical PR material the holograms are viewed with the help of a reading beam, as long as the initial writing (recording) beams are present. When the writing beams are turned off, the hologram written in the PR polymer decays at a rate determined by the material properties and ambient temperature.

The quality of the PR polymer and the written hologram can be evaluated with respect to three parameters: sensitivity, diffraction efficiency and persistence. The sensitivity is usually defined as the first temporal derivative of the dynamic efficiency measurement at the origin divided by the writing beams power. However, it is sometime more convenient to use the notion of writing time. Writing time and sensitivity are related quantities. As shown in FIG. 7, in continuous wave illumination, the writing time $T_w$ is simply how long the writing beams must illuminate the media to achieve the desired diffraction efficiency of the hologram. The diffraction efficiency 82 is defined as the ratio between the intensity of the diffracted beam and the incident beam. In theory, PR polymers can achieve up to 100% diffraction efficiency. The persistence is a measure of the rate of decay of the hologram.

Holographic 3D Displays

Holographic 3D displays are one application of re-writable holograms. Computer generated holographic 3D displays provide highly realistic images without the need for special eyewear, making them valuable tools for applications that require "situational awareness" such as medical, industrial, and military imaging. Current commercially available holographic 3D displays employ material like photopolymers or silver halide emulsion that lack image-updating capability, resulting in their restricted use and high cost. Dynamic updateable 3D holographic displays based on acousto-optic, liquid crystal display and MEMS based recording media have been demonstrated. Unfortunately, these devices do not have memory, and thus do not exhibit persistence of recorded images. The lack of persistence results in the requirement of update rates faster than 30 Hz to avoid image flicker. Since 3D images exhibit very high information content, this high refresh rate requirement currently limits real time holographic displays to small sizes or low resolution. Although updateable, PR polymers have not yet been used for 3D displays because of their long writing times and low persistence. The ultimate goal is to be able to write at high enough rates to provide near video capability. An interim goal is provide the capability to update holograms with reasonable write times, high diffraction efficiency and persistence long enough to view the display. To extend dynamic holographic 3D displays towards practical applications, alternative materials with high efficiency, reversible recording capabilities, memory, and significantly larger sizes are needed.

Integral Imaging

Integral imaging (also called integral photography) is an auto stereoscopic technique that allows reproduction of 3D images with a flat (2D) display. Auto stereoscopic means there is no need for the viewer to wear eyewear to see the 3D effect. This technique is summarized in FIG. 8 where an array of lenses 92 is placed in front of the regular flat display 90 (static or dynamic) to redirect the light coming from individual pixels 98 so the viewer see different information at different angles. Individual lenses 96 of the lens array cover a defined surface of the display 94. The vertical and horizontal resolution of this kind of 3D display is defined by the number of lenses per unit of surface. The angular resolution is defined by the number of individual pixels covered by an individual lens 96. There exist 3D cards and 3D television systems based on this principle.

It has to be noted that horizontal parallax only (HPO) system can be achieved if the spherical lens array 92 is replaced by a cylindrical lens array. In this case, the 3D effect is only seen in one dimension (horizontal if cylindrical lenses axis is vertical). HPO is interesting since it did not degrade the vertical resolution of the display 90, and reduces the number of individual lenses 96. Since human vision relies mainly on the horizontal separation of both eyes to determine depth, vertical parallax can be ignored without degrading the 3D information too much.

Integral Holography

Holography can also be used for integral imaging (referred to as "integral holography"). In this case, what was a collection of individual pixels 94 is shrunk into a single holographic pixel (hogel) by a lens. The function of the individual lenses 96 that collimate the beams is also recorded as a hologram into the material. The advantage is that the resolution can be much higher than with a regular lens array and 2D display since the pixels and lens do not need any physical embodiment. The resolution limitation now comes from the optical recording setup resolution that is usually orders of magnitude higher than regular lens array resolution.

A typical integral holographic optical system using a greyscale (single-color) transmission geometry is shown in FIG. 9. A laser 300 emits a coherent beam 310 that is split into a reference beam 320 and an object beam 330 by a beam splitter 340. The object beam is expanded by means of a telescope 350 and the beam's amplitude is structured by a device 360 that can be a transparent image, a mask, a spatial light modulator etc. The object beam is then resized by a telescope 370, directed by one or several mirrors 380, and focused by a lens 390 to the holographic recording material 400. That lens 390 is spherical in the case of full parallax and cylindrical in the case of horizontal parallax only. The reference beam 320 is shaped by optics 410 to match the shape of the object beam at the holographic material location, and directed by a mirror 420 to the holographic recording material. After one hogel has been recorded, the material is moved to the next hogel location by a translation stage 430. Controlling electronics 500 ensures the synchronization between the laser 300, the translation stage 430 and the device 360 that structures the object beam. In the case the device 360 that structures the object beam 330 is electronic; a memory 510 could be used to store the hogel data. During recording, the material is positioned or otherwise shielded so that the powerful writing beam is not incident on a viewer's eyes for safety.

When all the hogels have been recorded, the material is processed to develop the hologram (if needed) and moved to the reading position 440, where a reading source 450 emits a light beam 460 that is expanded by a telescope 470 and diffracted by the hologram 440 in a diffracted beam 480 toward the viewer's eyes.

In the case of a refreshable holographic recording material, when the hologram needs to be erased, the holographic recording device 400 is moved to the erasing location, where the erasing process occurs. In the case of erasure by light, like with photorefractive materials, an erasing light source 600 emits a beam 610 that is expanded with a telescope 620 and illuminates the whole hologram area. Some materials need a heating process for the hologram to be erased. Some materials like photo thermo plastic need electrical charging and heating the material to erase the hologram. Once erased, the recording material is moved back to the recording position.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides methods of recording holograms that reduce the writing time, increase the diffraction efficiency, improve the resolution, or restitute color. These techniques are well suited for use with an updateable 3D holographic display using integral holography and photorefractive polymer.

A system for recording a hologram includes a laser that produces a coherent beam and a holographic recording material. The laser beam is split into an object beam and a reference beam. The intensity of the object beam is spatially structured with information to write a hologram or part of a hologram in case of holographic stereogram. A beam steering mechanism steers the encoded object beam and reference beam to interfere at the holographic recording material to record the hologram or sequence of holograms.

In an embodiment in which the holographic recording material comprises a photorefractive (PR) polymer, a holographic optical element (HOE) diffracts one of the object or reference beams to reduce the angle between the grating vector and the external dielectric field and increase the diffraction efficiency of the PR polymer. In one configuration the HOE is configured to allow one of the object or reference beams to pass there through and to diffract the other beam to reduce the angle between the grating vector and the external electric field to increase the diffraction efficiency of the PR polymer.

In an embodiment in which the system is configured for a transmission geometry and recording a full-parallax holographic stereogram, a first lens array focuses the object beam on the recording material at multiple positions. The object beam is spatially structured so that each position corresponds to the correct hogel data. A second lens array splits the reference beam into multiple reference beams that are directed to the first lens array that collimates the multiple reference beams. If the beams overlap each other at the second lens array, the array is implemented as a HOE including an angularly selective grating to let the object beam pass unaffected while splitting and redirecting the reference beams. The second lens array may be implemented as a HOE that also diffracts the reference beams to reduce the angle between the grating vector and the external dielectric field and increase the diffraction efficiency of the PR polymer. The multiple object and multiple reference beams interfere at the multiple positions on the material to write multiple hogels simultaneously. The lens arrays may also be configured for HPO or reflective geometry as well.

In an embodiment in which the object and reference beams interfere at multiple locations that are spaced apart on an x-y grid to spatially multiplex the recording of the holography, the first and second lens arrays may be translated along a single axis at an oblique angle to the x-axis to write multiple holograms over the entire surface of the recording material as a series of parallel rows. This is an effective scanning system using only one translation direction and a fixed sample.

In an embodiment in which a color hologram is recorded using integral holography in transmission geometry, a spatial light modulator (SLM) having different zones is loaded with hogel data for different colors to spatially structure the object beam and form the modulated object beam. A focusing lens redirects the different zones of the modulated object beam at correct angles of incidence for each color towards the recording material such that diffraction of multiple color reading beams through the recording material produces multiple object beams with different colors that superimpose at a common viewer position.

In an embodiment in which the holographic recording material comprises a photorefractive (PR) polymer in a system for multiplexed recording of color holographic stereogram in a transmission geometry, a first optical system separate the laser beam into reference and object beams having both orthogonal polarization components (horizontal and vertical or circular left and right polarizations). A second optical system splits the object beam into first, second and third object beams. The first and second object beams have one polarization component and the third object beam has the orthogonal polarization component. The first and second object beams are positioned to have a symmetrical angle of incidence so that the grating vector of a hologram formed by cross-talk is perpendicular to the external electric field applied to the material so that the diffraction efficiency is near zero. The angles of incidence for all three object beams satisfy the Bragg equation so that when, for example, each hologram is read with a different color it displays a full color hologram in the direction of the audience.

In an embodiment in which the hologram is recorded using integral holography for a display, a holographic element is positioned after the recording material to redirect the reading beam diffracted by the hologram approximately orthogonal to the recording material toward the viewer position to provide a more natural look at the display. Positioning a holographic lens after the material changes the orientation of the cones of light diffracted by the hogels. The lens may be designed so that rays of light entering the viewer pupil have the same angles inside the cone of light for each hogel and the correct part of the hogel is perceived rendering the correct image with the viewer located at a specified finite distance.

In an embodiment in which the hologram is recorded using integral holography for a display and the modulated object beam is spatially structured with hologram data for multiple holograms, a first HOE splits and diffracts the reference beam into multiple reference beams, a second HOE collimates the multiple reference beams and focuses the object beam so that the multiple object and multiple reference beams interfere at multiple positions on the material to write multiple holograms simultaneous, and a third HOE positioned after the recording material to redirect a reading beam transmitted through the recording beam approximately orthogonal to the recording material toward a viewer position to provide a more natural look at the display.

In an embodiment in which the system uses integral holography in a full-parallax transmission geometry to record and display holograms, a mask/mirror is positioned between the laser and the holographic recording material. The mask mirror comprises an aperture that defines the extent of a hogel and a mirror surface facing the recording material. A translation stage moves the mask/mirror to synchronize the position of the aperture with the location of the steered object and reference and beams. A read source is positioned on the opposite side of the recording material to direct the reading beam through the material where it reflects off the mirrored surface and is transmitted back through the hologram in the material where it is diffracted to produce the diffracted beam. A filter may be positioned between the recording material and the viewer to absorb the object and reference beams that may pass through the material.

In an embodiment in which the system is configured to record hologram(s) on a dynamic holographic recording material comprising a PR polymer, the object beam is used to simultaneously erase the structure of the previous hologram and write the current hologram. The laser power is high enough to erase the previous hologram without leaving a ghost image and low enough to record the current hologram without causing a permanent set. In a configuration, the object beam reduces the diffraction efficiency of the previous hologram to less than 20% when writing the current hologram.

In an embodiment for the display of holograms in an HPO geometry, the horizontal and vertical image planes need to be disassociated during the holographic recording. The best resolution happens when the vertical image plane is at the holographic recording material position and the horizontal image plane is near the Fourier cylindrical lens position. The object beam is shaped by a spherical lens and then collimated with a spherical mirror at an angle. The natural astigmatism of the spherical mirror is used to disassociate the image plane so the horizontal image plane is near a Fourier cylindrical lens and the vertical image plane is near the holographic recording material.

In an embodiment in which the holographic recording material comprises a PR polymer, a pair of interleaved electrodes is deposited on one surface of the PR polymer. With such a pattern, the orientation of the electric field is parallel to the sample surface if the sample is thin compared to the space between the electrodes. If the plane of incidence (plane comprising both writing beams) has a component parallel to the field vectors, the grating vector will also have a component along the electric field and the photorefractive effect will occur.

These and other features and advantages of the invention will be apparent to those skilled in the art from the following detailed description of preferred embodiments, taken together with the accompanying drawings, in which:

DETAILED DESCRIPTION OF THE INVENTION

The present invention provides methods of recording holograms that reduce the writing time, improve the resolution, increase the efficiency, or restitute color. These techniques are well suited for use with an updateable 3D holographic display using integral holography. These techniques may be used individually or in combination.

In photorefractive polymer materials the diffraction efficiency strongly depends on the angle between the grating vector and the external applied field direction. The grating vector is perpendicular to the bisector of the object and reference beams inside the recording material. The diffraction is minimum when this angle is 90° and maximum when this angle is 0°. This is due to the charge transport mechanism that is governed by drift. When using a PR polymer it is important to minimize this angle to optimize the diffraction efficiency. For transmission gratings, this is achieved by using a non-symmetrical geometry where the sample is tilted according to the bisector formed by the object and reference beams. However, for some applications, there exist constraints on the geometry, and this angle is limited to a certain value. This is the case for a 3D display where there is optics obstruction in the recording setup.

Figure 10:
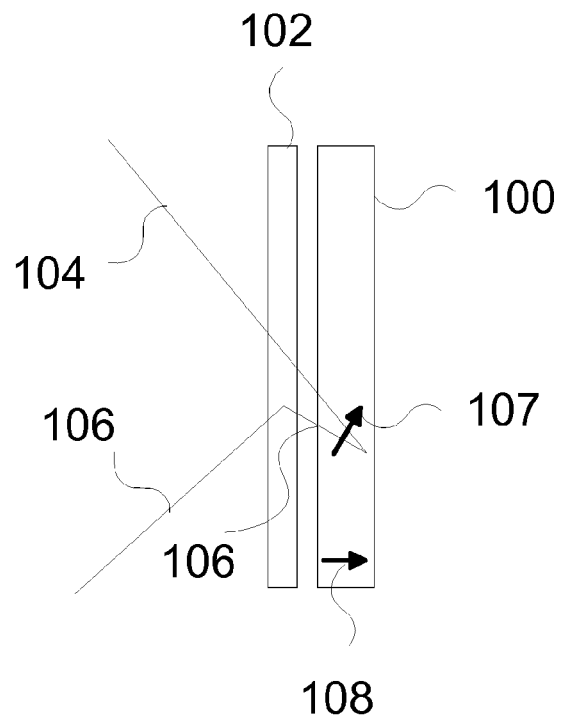
FIG. 10 is a diagram of a holographic optical element for improving diffraction efficiency in accordance with an embodiment of the invention.

A holographic optical element (HOE), or a combination of such elements, redirects the beams near the sample to increase the incident angle without changing the holographic recording setup main optics. As show in FIG. 10, a holographic optical element 102 (e.g. a diffraction grating) is designed and positioned so that a writing beam 106 is diffracted toward a PR material 100 while the other recording beam 104 passes through element 102 without being diffracted. This can be achieved by using a highly angular selective diffraction grating. In this geometry, the grating vector 107 into the holographic recording material is redirected at a shallower angle considering the device external field vector 108. This reduces the angle between the grating vector and the external electric field to increase the diffraction efficiency of the material. In an alternate embodiment, HOE 102 may be positioned so that only the diffracted writing beam 106 passes there through. The writing beam may be either object beam or the reference beam.

A holographic optical element 112 may be used in combination with a lens array to multiplex the holographic recording in order to reduce the recording time. The technique of integral imaging by holographic recording requires the whole display surface to be filled with holographic pixels. In the case of large surface and good resolution, a large number of pixels need to be recorded. Recording multiple pixels at once (spatial multiplexing) is a way to reduce the recording time.

Figure 11:
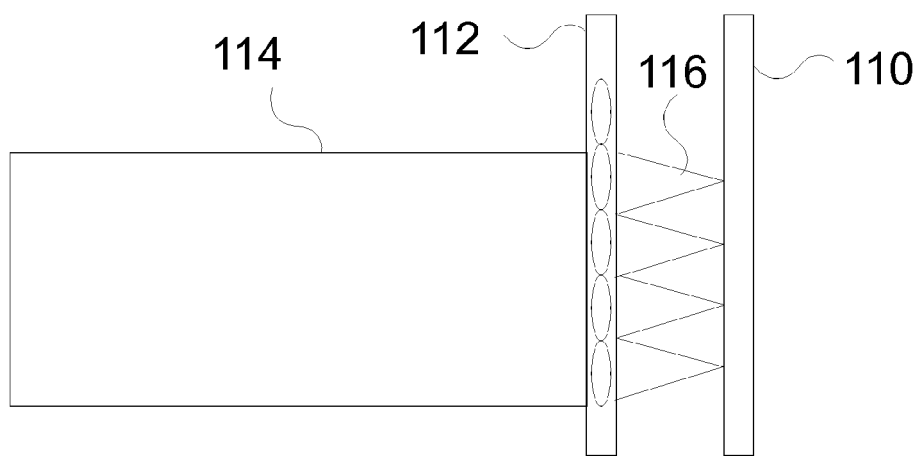
FIGS. 11, 12 and 13 are diagrams illustrating the use of holographic optical elements to multiplex the recording of the hologram in accordance with an embodiment of the invention.

FIG. 11 shows how a lens array (HOE or other) 112 that refracts (diffracts) a first writing beam 114 (e.g. the object beam) into multiple writing beams 116 incident on a sample 110. The writing beam or beams may be modulated with a single SLM that is spatially structured to coincide with the multiple writing beams or with multiple SLMs, one for each writing beam. To effectively write multiple holograms into the sample, the second writing beam (the reference beam)

must also be incident to the sample and overlap the first beam spots. If the second beam is uncorrected, it will pass through the lens array 112 and be focused outside the spots of the first beam.

Figure 12:
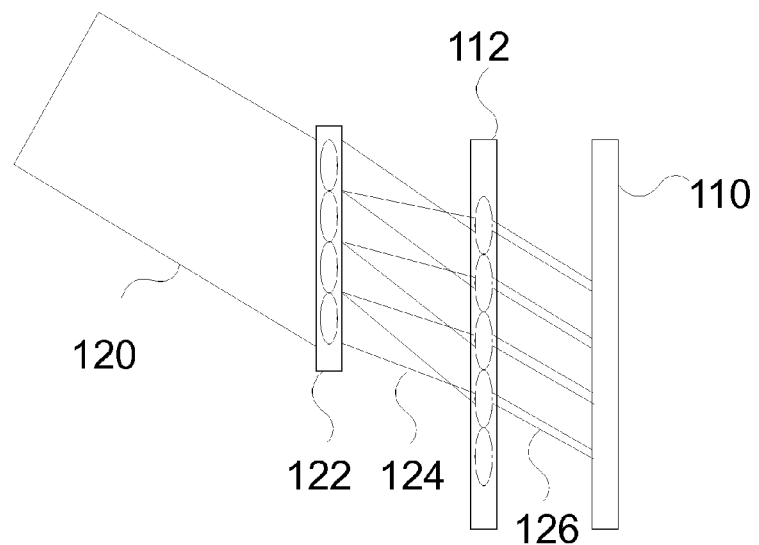

As shown in FIG. 12, to compensate for that misalignment, a second lens array (refractive or HOE) 122 is introduced into the path of a second writing beam 120 (e.g. the reference beam) and refracts (diffracts) the beam into multiple reference beams 124 at the correct angle. When these second writing beams 124 pass through the lens array 112, the beams are redirected as beams 126 to the same spots where the first beams 116 are focused at the sample location 110.

To optimize the image quality for integral holography purpose, the second beams 126 may be collimated when incident to the sample and the spot size at the sample location should match the spot size of the first beams 116. To achieve both functions, the lens arrays 112 and 122 should work as a telescope so the diameter of the beams 126 matches the diameter of the beams 116 at the sample location (see FIG. 13).

To overcome the problem of obstruction of the lens array 122 for the first beam 114, the lens array can be replaced by a HOE comprising an angular selective grating that only diffracts the beam coming at a specific angle. Beam 120 is oriented accordingly so it is diffracted and focused by the HOE while beam 114 passes through, unaffected (see FIG. 13).

In case of horizontal parallax only geometry, the lens arrays are constituted of vertical cylindrical lenses. In case of full parallax, the lens arrays are constituted of spherical lenses.

Figure 13:
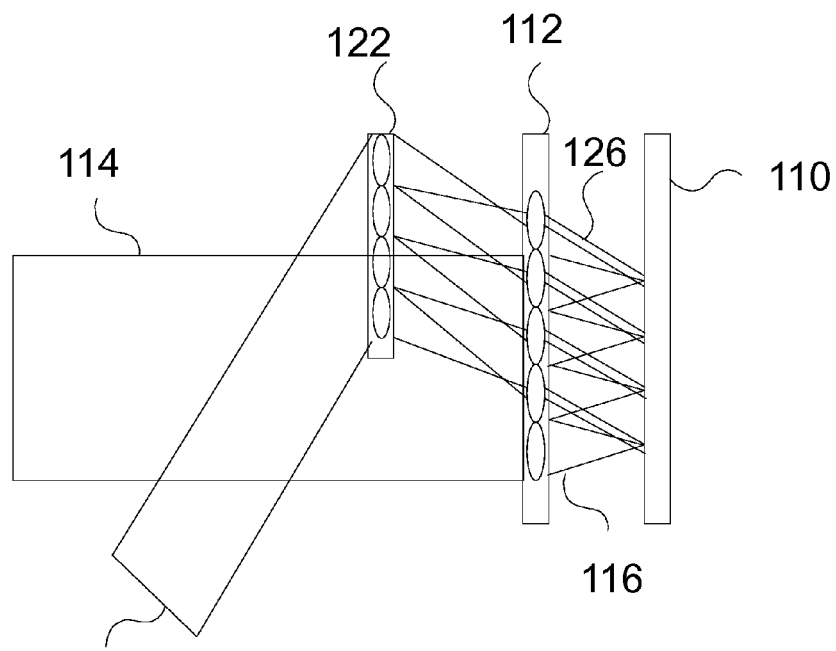

This system can be used in conjunction with the HOE designed for efficiency improvement. The holographic element that redirects the reference beam to improve diffraction (element 102 FIG. 10) and the one that focuses the reference beam (element 122 FIG. 13) can be combined into a single HOE that performs both those functions. In FIG. 13, the object beam is horizontal for the sake of clarity instead of tilted as presented in FIG. 10. The benefit of this combination is more compact setup with less optical surfaces.

Figure 14:
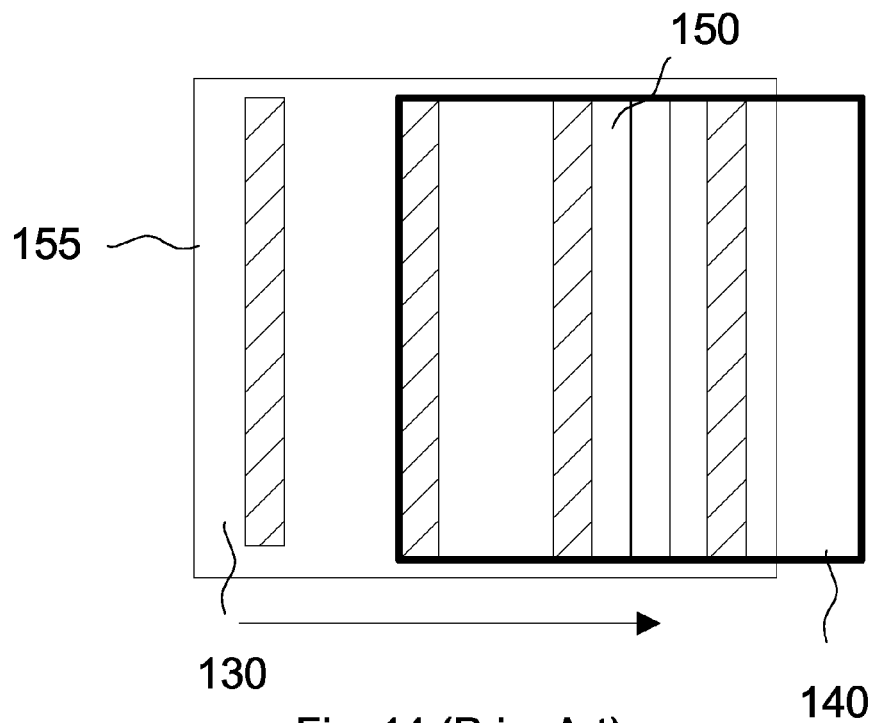
FIGS. 14, 15 and 16 are diagrams for a single axis scanning system for full surface recording of a pixilated holographic display in accordance with an embodiment of the invention.

As presented in FIG. 14, in the case of spatial multiplexing, in horizontal parallax only configuration, the horizontal displacement of the lens array 112 and the holographic element 122 is enough to cover the entire surface of the recording material 140 with hogels 150 as a series of parallel rows and record the full hologram.

Figure 15:
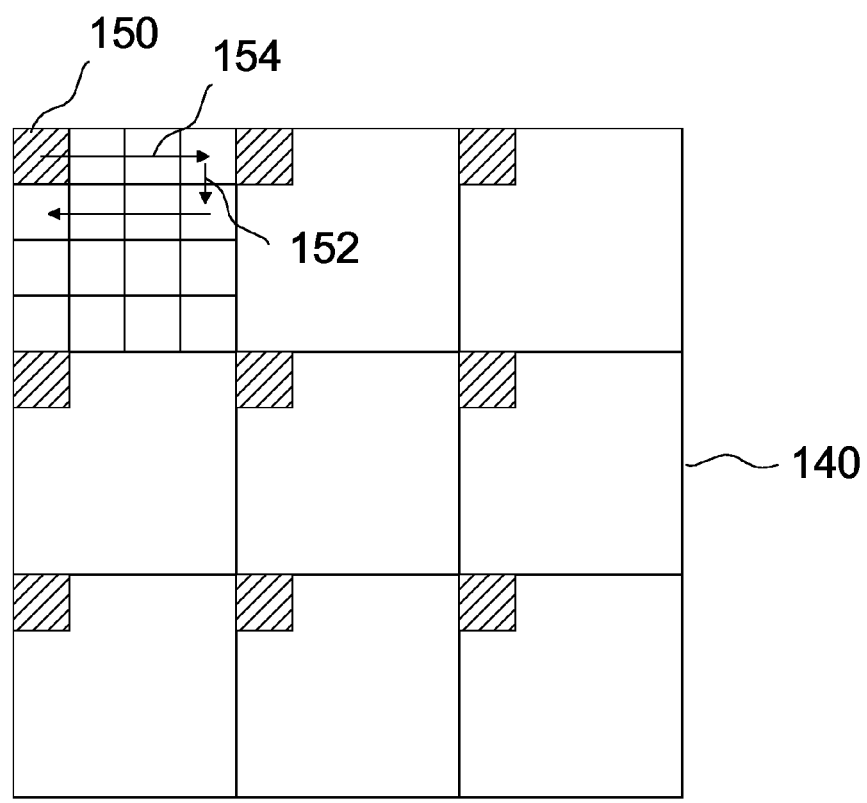

As shown in FIG. 15, if the same horizontal displacement 154 is conserved for full parallax geometry in which the object and reference beams interfere at multiple positions that are spaced apart on an x-y grid to spatially multiplex the recording of the holography, another vertical translation axis 152 is necessary to cover the whole area of the sample 140 with square hogels 150 in a raster scan mode.

Figure 9:
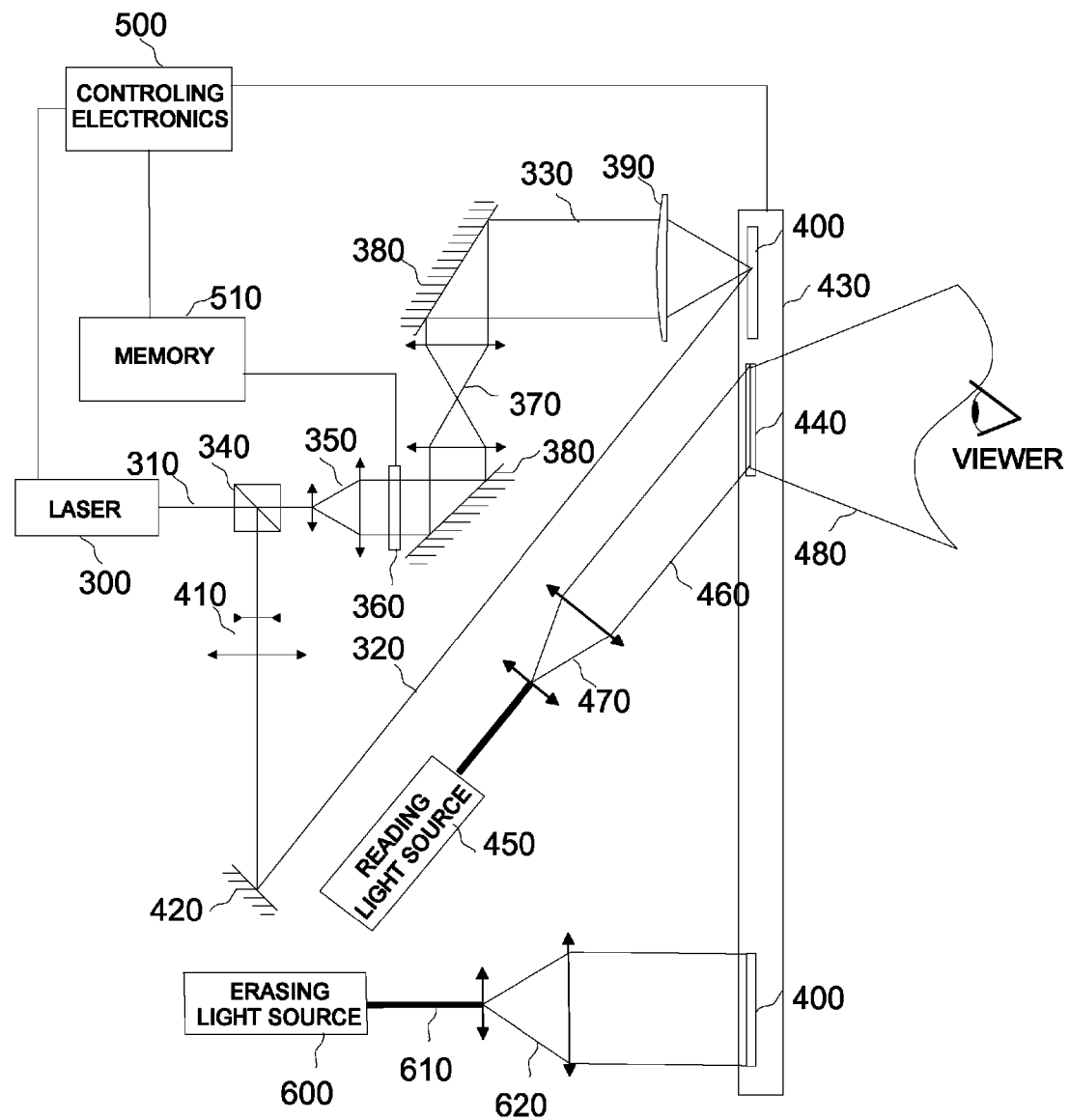
FIG. 9, as described above, is a diagram of an integral holographic setup for writing, reading and erasing holograms.
Figure 16:
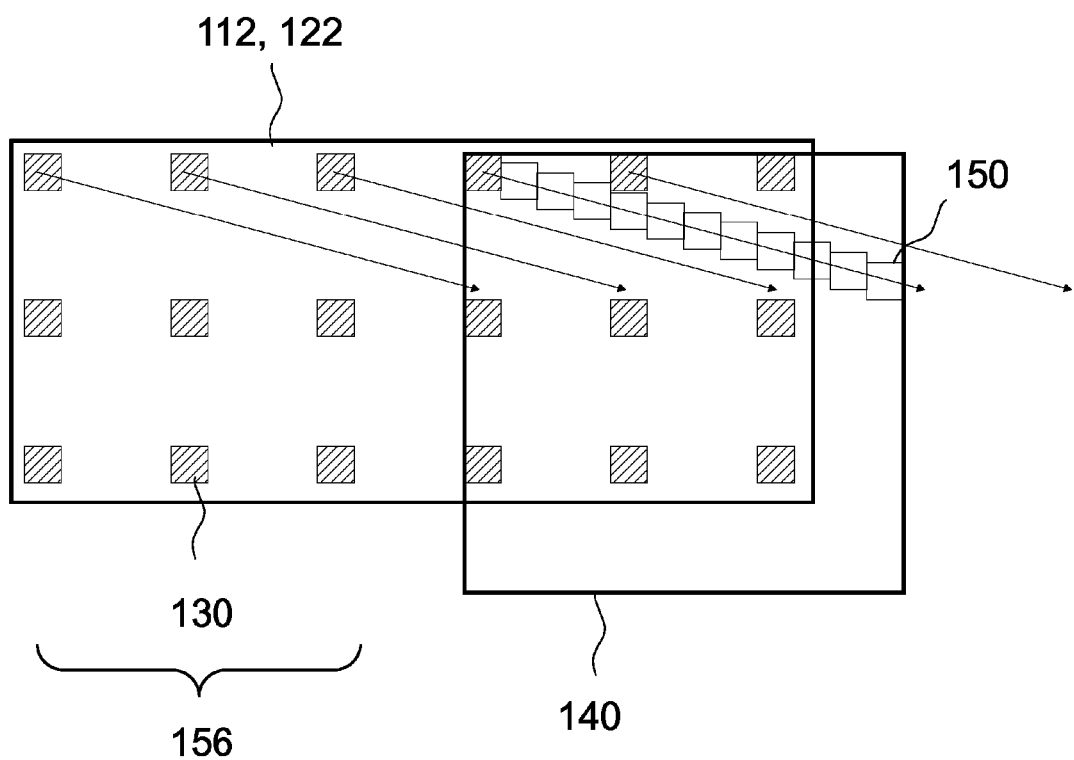

As shown in FIG. 16, the lens arrays 112 and 122 may be translated along a single axis at an oblique angle to the x-axis write the hogels 130 over the entire surface of a recording material 140 as a series of parallel rows 150. This is an effective scanning system using only one translation direction and a fixed sample; there is no need to move the sample as shown in FIG. 9. The only condition is that there is a group of spare pixels 156 on the side of the sample to cover the whole area of the sample.

Color transmission holograms can be made (among other techniques) by angular multiplexing several transmission holograms that will diffract specific color when replayed. Recording angles are selected so the Bragg grating equation is fulfilled when replayed with a different wavelength than the recording wavelength. The angle should also be such that the diffracted beams coming from the different holograms superimpose on each other so the viewer sees the different views as a single colored hologram.

Figure 17:
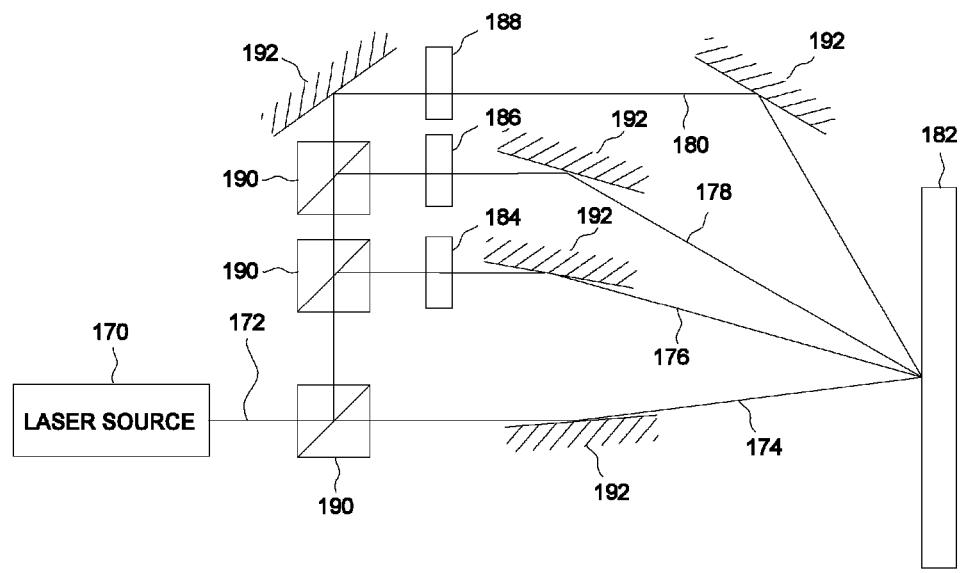
FIGS. 17 and 18 are diagram of a multiplexed recording of a color hologram in accordance with an embodiment of the invention.

A known technique for recording an angular multiplexed hologram in which only the chief ray is drawn for the sake of clarity is shown in FIG. 17. A laser light source 170 emits a coherent light beam 172. Beams splitters 190 separate the beam into one (or several) reference beam 174 and several object beams 176, 178 and 180. Mirrors 192 reorient the different beams so they interfere at the holographic recording material location 182. The different object beams are modulated with separated devices (spatial light modulator) 184, 186, and 188 to encode the color information.

To make the optical system more compact, different portions of the spatial light modulator may be dedicated for different colors in accordance with the invention. As shown in an embodiment in FIG. 18, the lenslet array has been reduced to one single lens and a single SLM is used to write the 3 colors. A laser light source 200 emits a coherent beam 202 that is split into a reference beam 206 and an object beam 208. The object beam is expanded by the means of a beam expander 210 (aka two lenses) to fit the spatial light modulator device 214 size. The spatial light modulator is divided in three different zones 216, 218, and 220 corresponding to different holograms to be multiplexed. The different zones are loaded with hogel data for the three different colors to spatially structure the object beam. A focusing lens 224 (e.g. a holographic optical element) redirects the different portions of the object beam 226, 228, and 230 at the correct angles toward the holographic recording material 232.

To read the three holograms responsible for the three colors, three colored reading beams are transmitted through the recording material where they are diffracted to reproduce the three object beams. However, since the colors of the reading beams are different from the color of the writing beam, the diffracted angles are not identical to the writing angles on account of spectral dispersion. If the object beams incident on the recording material were parallel during recording, the diffracted object beams will diverge from each other during display and the colors will not superimpose at a common viewer position but instead will be seen at different viewer positions. To correct for this, the object beams must have a different angle predetermined by the Bragg law. Those angles referred to above as the "correct angles" can be imposed to the object beam by using the focusing lens 224 that redirects the spatially separated parallel beams. That spatial separation (structure) can be achieved by using different zones of one single SLM.

Figure 18:
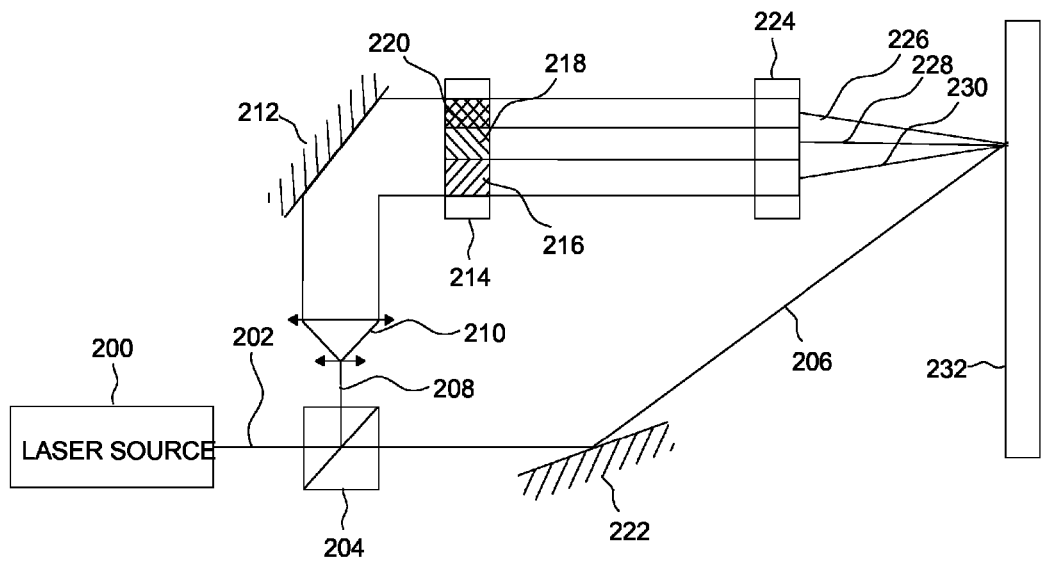

Element 224 from FIG. 18 can be the same as element 112 from FIG. 13. In this particular case, color and multiplexing are combined together to write several hogels at once that will reproduce color.

Full color holograms can be generated by integral holography by recording three holograms one for each fundamental color (red green and blue). One approach is to use three separate writing lasers, one for each color. Depending on the recording geometry, different techniques can be used. In transmission geometry, angular multiplexing can be used with a single laser source to successively record the three holograms. However, in the case of a dynamic material such as a photorefractive material, the successive hologram erases (at least partially) the preceding one, leading to a decrease in diffraction efficiency. To simultaneously write two or more holograms, the recording beams that belong to different holograms should not interfere with each other. Otherwise, interferences and undesirable holograms are written that produce color cross-talk and decrease the overall diffraction efficiency. In this case the beam is separated into reference and object beams having both polarization components (horizontal and vertical or circular left and right polarizations). The object beam is split and polarized to produce three object beams that are incident at different angles to the media. To avoid cross talk between the resulting holograms, two of the object beams have orthogonal polarization. The third beam, which must have one of the two polarizations, is positioned at an angle of incidence to take advantage of the fact that photorefractive polymers do not record holograms if the vector is orthogonal to the external electric field. Each object beam is encoded with hogel data for one of the primary colors. This can be done with a dedicated SLM for each object beam or with a single SLM that is spatially structured to modulate all of the object beams simultaneously.

Figure 1:
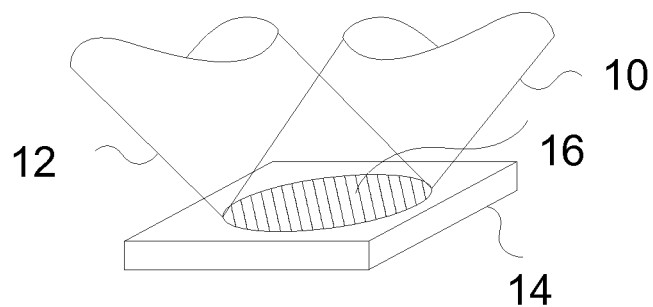
FIG. 1, as described above, is a diagram of a transmission geometry for forming a hologram.
Figure 2:
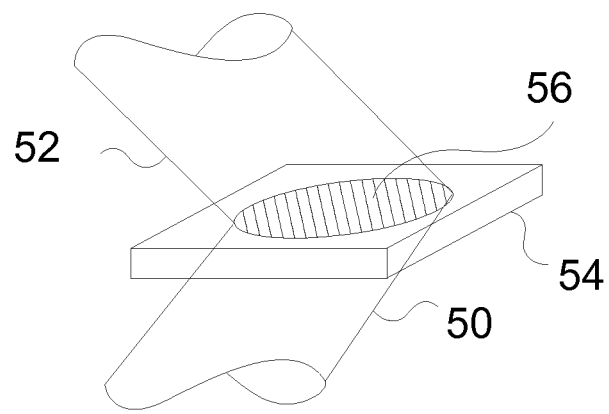
FIG. 2, as described above, is a diagram of a reflection geometry for forming a hologram.
Figure 3:
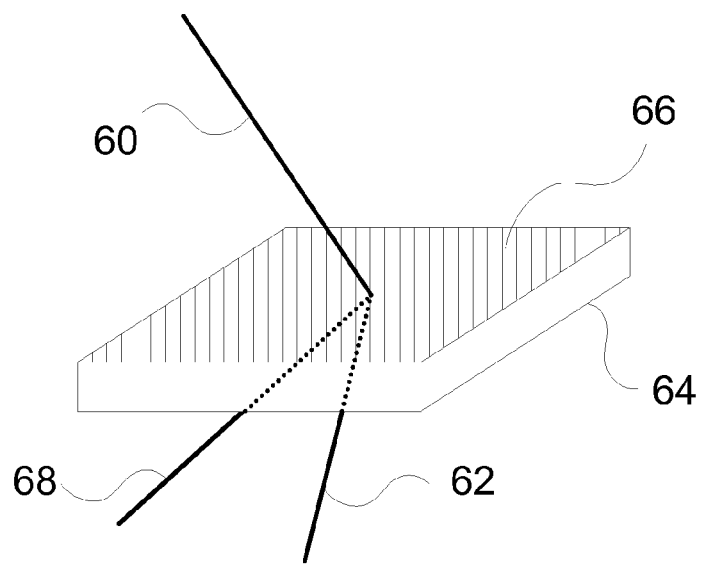
FIG. 3, as described above, is a diagram of a transmission geometry for reading a hologram.
Figure 4:
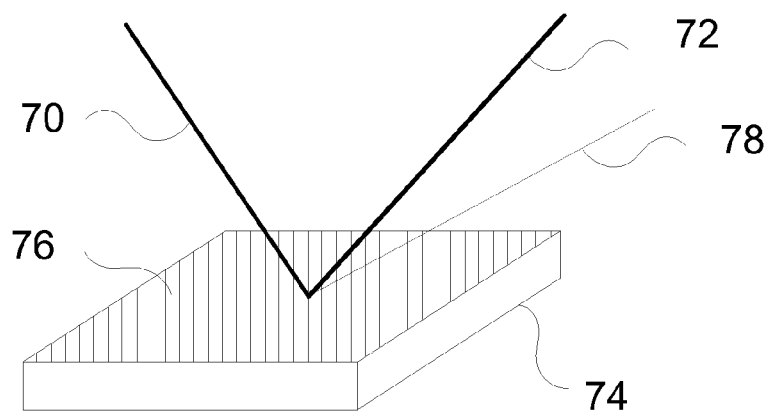
FIG. 4, as described above, is a diagram of a reflection geometry for reading a hologram.
Figure 5:
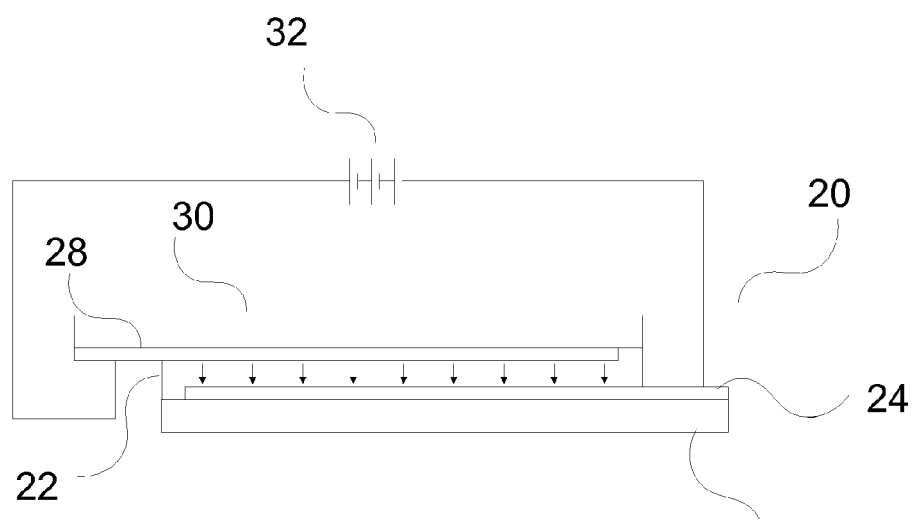
FIG. 5, as described above, is a diagram a recording device using a photorefractive polymer material.
Figure 19A:
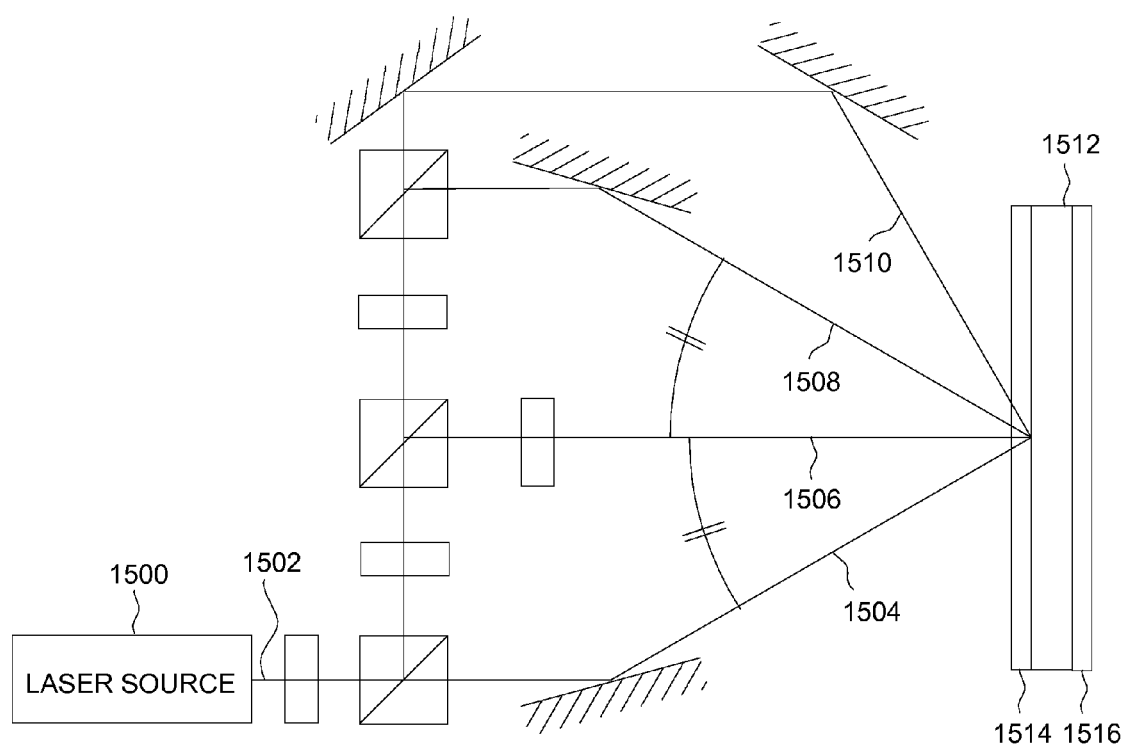
FIGS. 19a and 19b are diagrams of different embodiments of a symmetrical geometry to simultaneously record a multiplexed hologram in a photorefractive media is a diagram of a multiplexed recording of a color hologram in accordance with an embodiment of the invention.

An embodiment of a recording geometry with angular and polarization diversity is presented in FIG. 19*a*, a single laser source 1500 emits a coherent light beam 1502 that is split into 4 recording beams 1504, 1506, 1508 and 1510 with the appropriate optical elements (e.g. polarizing beam splitters and wave plates). Those beams interfere into the photorefractive polymer material 1512 that has electrical electrodes 1514 and 1616 on opposing surfaces (see FIG. 5). For example, an optical system splits beam 1502 into reference beam 1510 containing both orthogonal polarizations and the object beam and a second optical system splits the object beam into three different object beams 1504, 1506 and 1508. Beams 1504 and 1508 have the same polarization and are incident to the sample with opposite angles according to the surface normal so that the grating vector of a hologram formed by cross-talk is perpendicular to the external electric field applied to the material. Beam 1506 has the orthogonal polarization to beams 1504 and 1508. Polarization can be selected and changed with the appropriate optical elements (e.g. polarizing beam splitter and wave plates). The orthogonal polarizations may be horizontal and vertical or circular left and circular right, for example. With this configuration, there are three holograms that will be simultaneously recorded. Those are constituted with the following pair of beams: 1510/1504, 1510/1506 and 1510/1508. There is no interference between beams 1506 and 1504 or 1508 since their polarization is orthogonal. There is interference between beams 1504 and 1508 but the efficiency is negligible since the grating vector is perpendicular to the external electric field of the PR material. The angles of incidence for all three object beams satisfy the Bragg equation so that when each hologram is read with a different color it displays a full color hologram in the direction of the audience.

Figure 19B:
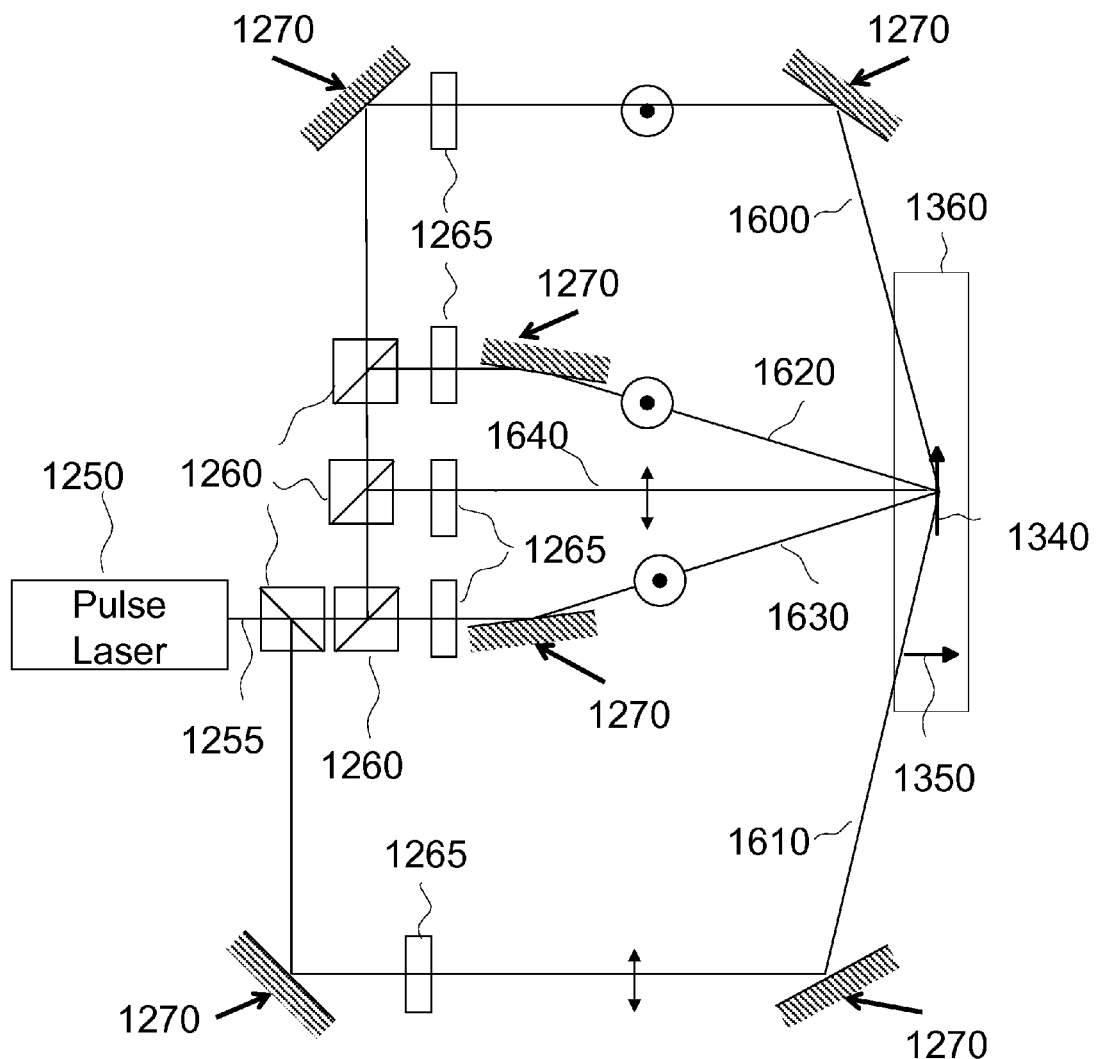

Another embodiment of a recording geometry with angular and polarization diversity is presented in FIG. 19*b*, a single laser source 1250 emits a beam 1255 having both polarizations that is split, polarized and reflected off a series of beam splitters 1260, polarizers 1265 and mirrors 1270 to produce three object beams and two reference beams with the specified polarizations and angles of incidence. The two object beams have orthogonal polarizations to prevent their interference. Among the three object beams, the central one 1640 have one polarization and both external ones 1620 and 1630 have the orthogonal polarization. They are directed along the viewing direction of the display (horizontal). Since angular correction needs to be applied for the three colors to superimpose in the direction of the viewer, the three object beams have different angles according to the pulsed laser wavelength and the color the particular hologram should reproduce. In the case of a doubled YAG laser emitting at 532 nm (green), and a horizontal viewing direction for a red green and blue display (RGB), the horizontal object beam 1640 and the reference beam 1610 are recording the "green hologram". In this case "green hologram" means that it is the color that the hologram will reproduce toward the viewer direction. Since a shift toward longer wavelengths (red) between the recording and the reading wavelength increases the diffraction angle, the angle between the object and reference beams for the "red hologram" should be smaller. Thus, the object beam 1620 and the reference beam 1600 should record the "red hologram". Conversely, the object beam 1630 that is at larger angle, and the reference beam 1600 should record the "blue hologram". Depending of the holographic material properties (thickness and index modulation), both those holograms (blue and red) could diffract the "wrong color", i.e. the blue hologram diffracting red reading beam and the red hologram diffracting blue reading beam. However those colors will be directed at larger and smaller angle compare the direction of the viewer (horizontal) and will not be perceived by the viewer. The fact that the angle between the object beams 1620 and 1630 is symmetrical according to the electrodes of the photorefractive device prevents those beams to write an efficient diffraction grating even though they have the same polarization.

The advantages of this method are that there is only one laser source, recording is done simultaneously; there is no cross talk between holograms when replayed. There are three independent holograms so color could be coded on each different one for full color reproduction.

This technique can be used alone or in conjunction with other cases described in the document. This technique may be combined with the case where different zones of the same SLM are dedicated for different colors; a polarizer can be used on the top of the different SLM zones to rotate the polarization as needed. The advantage of this combination is only one SLM is needed to write the entire hologram reproducing color. The technique may be combined with the case where each multiplexed cone can contain the 3 beams (top, middle, and bottom) to record the 3 colors. The advantage of this combination is multiplexing number of holograms while including color reproduction there is so a spatial AND angular multiplexing.

Figure 20:
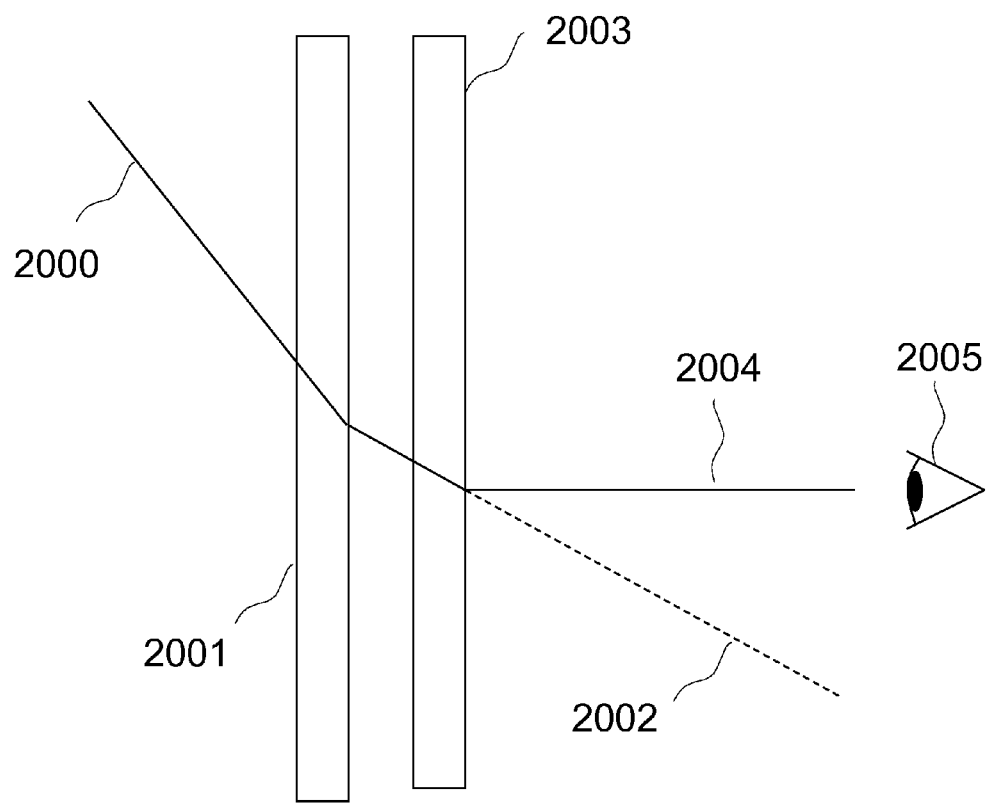
FIGS. 20, 21 and 22 are diagrams illustrating the use of a holographic element for view plane compensation in accordance with an embodiment of the invention.

As shown in FIG. 20, the use of an HOE to increase the diffraction efficiency has a potential disadvantage. When reading the hologram from holographic recording material 2001, the reading beam 2000 is diffracted at a sharp angle 2002. This is an inconvenience for a natural look at the display. To compensate for this effect, a holographic optical element 2003 may be added and positioned after the holographic recording material 2001 to redirect the beam 2004 approximately orthogonal to the material toward the viewer position 2005.

Figure 21:
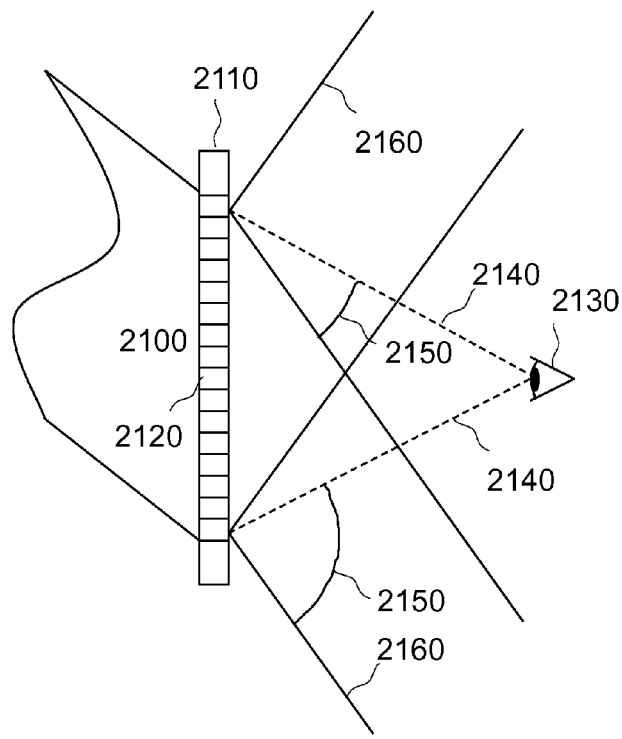

The use of a holographic element has yet another advantage in integral imaging/holography. For accurate reproduction of the 3D image, the light rays coming from different lenslets/hogels should provide the correct information at the correct angle. However, when no correction is applied as shown in FIG. 21, the reading beam 2100 is diffracted by the holographic recording material 2110 and more specifically by each individual hogel 2120 as a cone of light 2160. When the viewer 2130 is located at a finite distance, the rays of light 2140 entering the pupil from different hogels have different angles 2050. This projects different parts of the 3D image and distorts the image unless the viewer is located at infinity.

Figure 22:
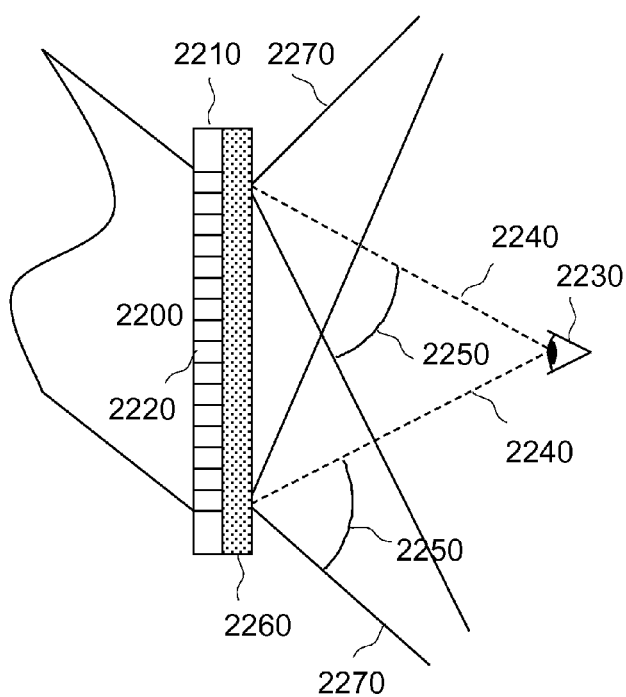

As presented in FIG. 22, the introduction of a lens element 2260 (e.g. a HOE) after the holographic recording material 2220 changes the orientation of the cones of light 2270 diffracted by the hogels 2220. So, the rays of light 2240 entering the viewer pupil 2230 have the same angles 2250 inside the cone of light for each hogel, and the correct part of the hogel is perceived rendering the correct image with the viewer located at a finite distance. It has to be noted that the use of an off axis holographic lens is possible because of the steep angle of the diffracted beam coming out of the holographic recording material (see FIG. 20) since on axis holographic lens is not feasible. Thus, the use of a holographic lens, instead of a refractive lens, solves two problems at once: the angle of view and the image distortion.

In an embodiment, elements 2003 and 2260 are the same holographic optical element.

Figure 30:
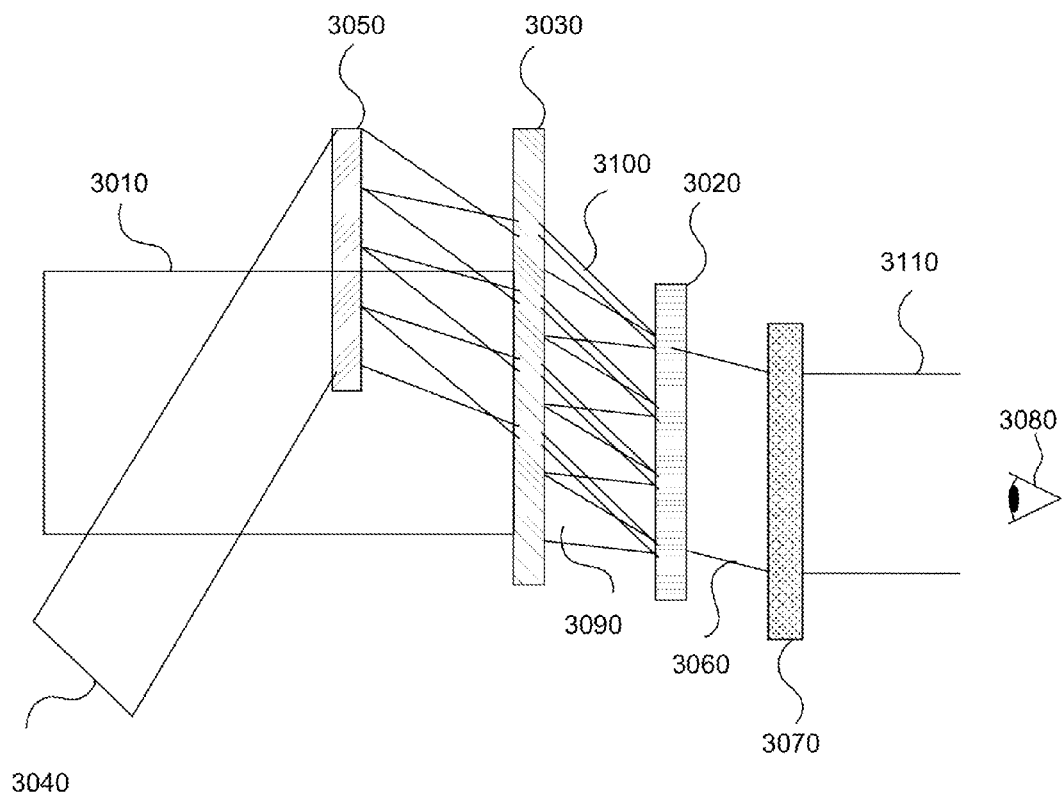
FIG. 30 is diagram of holographic system employing three HOEs to multiplex the recording of the hologram, improve the diffraction efficiency and provide for view plan compensation.

FIG. 30 shows an object beam 3010 being structured in several beams and focused in the holographic recording material 3020 by a holographic optical element (HOE) 3030. The reference beam 3040 is structured into several beams by HOE 3050 and then collimated by the HOE 3030. Object and reference beams (3090 and 3100 respectively) interfere into the holographic recording material 3020. HOE 3050 also diffracts the several reference beams to reduce the angle between the grating vector and the external electric field and increase the diffraction efficiency of the PR polymer. When the hologram has been recorded, a reading beam coming along the direction of the reference beam is diffracted along the direction of the object beam. That reading beam 3060 is inclined. To restore the view zone perpendicular to the screen HOE 3070 diffracts the reading beam 3060 into beam 3110 that is directed toward the viewer 3080.

Transmission hologram geometry requires the reading beam to go through the media. Typically the reading light originates from the opposite side of the sample than the viewer. In known 3D displays, the obstruction of the writing optics prevents the orientation of the reading beam correctly at the same location the hologram is recorded. The solution was to move the sample to a different location to achieve the reading of the hologram (see FIG. 9 in prior art). For a refreshable 3D display this is a drawback since the sample has to move each time the hologram needs to be refreshed. This technique is not possible for a fast refreshing rate.

Figure 6:
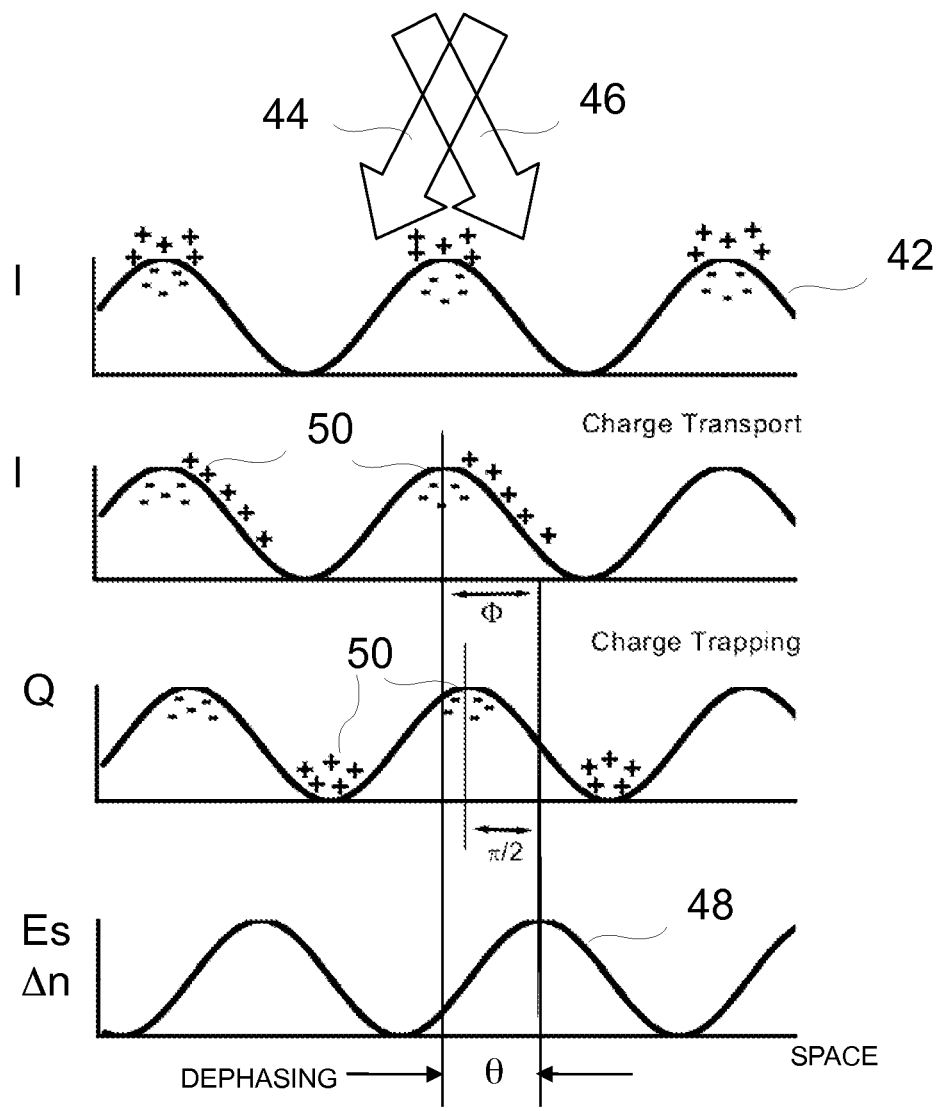
FIG. 6, as described above, is a diagram illustrating the photorefractive effect.
Figure 7:
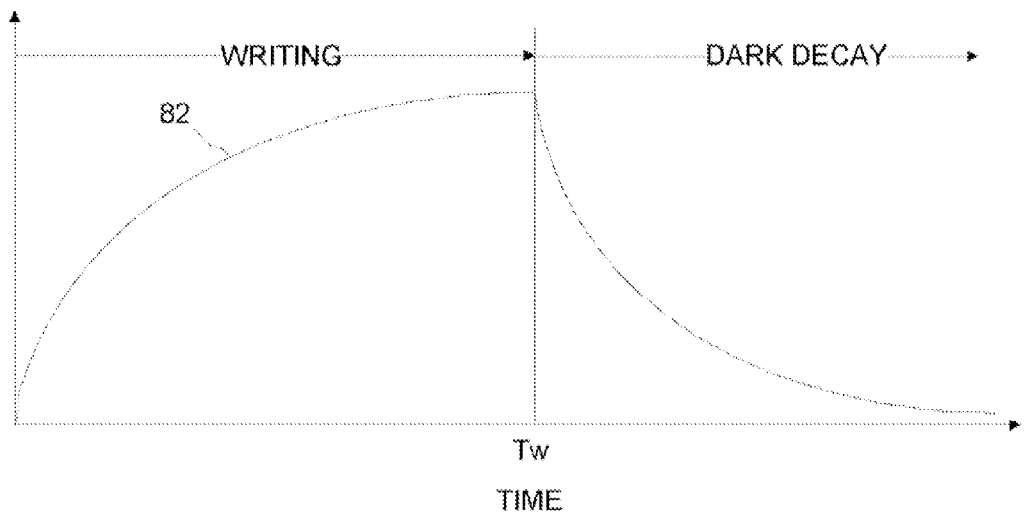
FIG. 7, as described above, is a diagram of the diffraction efficiency during a write and dark decay.
Figure 8:
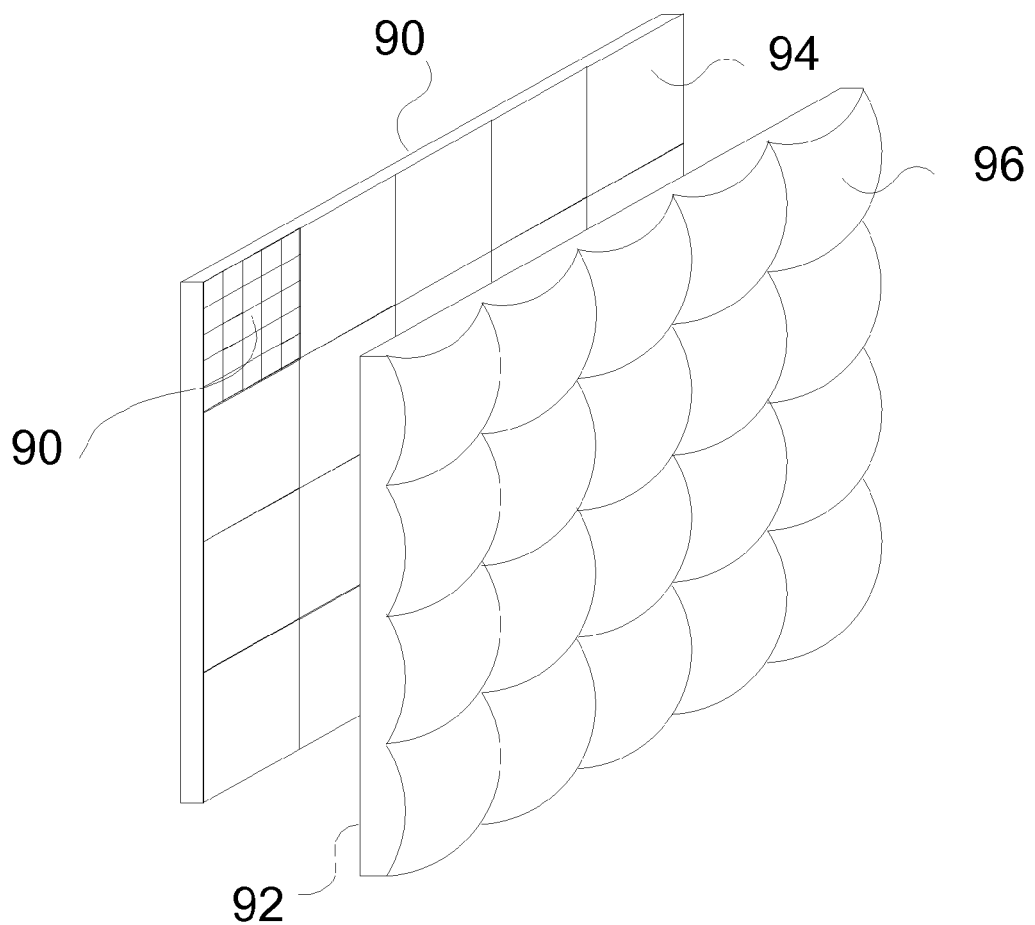
FIG. 8, as described above, is a diagram illustrating an integral imaging technique for reproducing 3D images with a 2D display.
Figure 23:
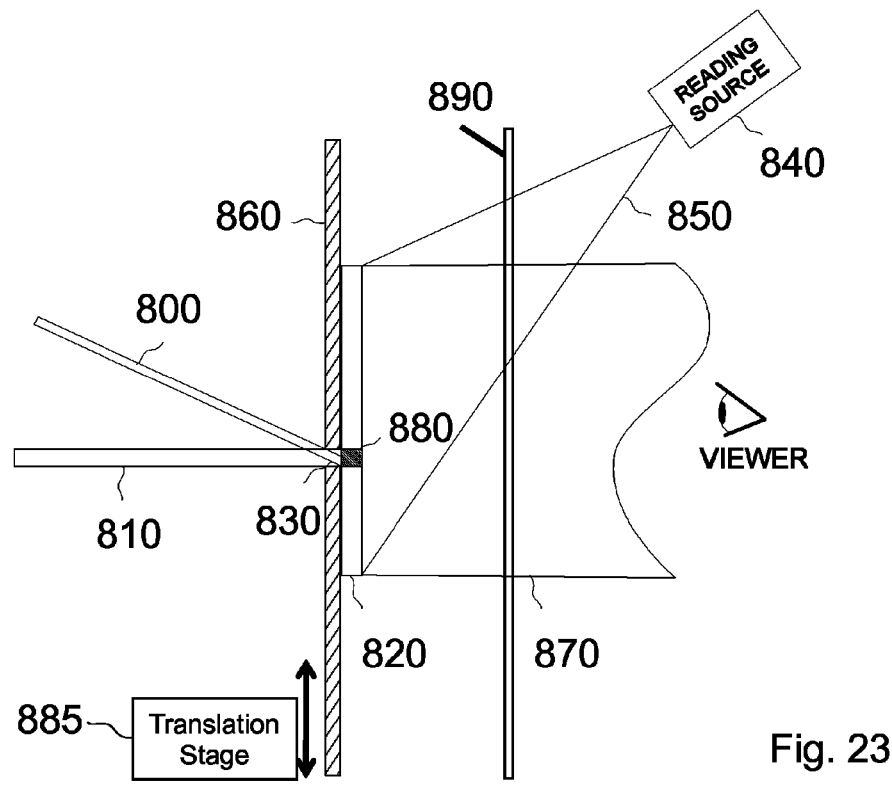
FIG. 23 is a diagram of a retroflector for simultaneous writing and reading for a transmission geometry in accordance with an embodiment of the invention.

As described previously the whole sample may be scanned (recorded) by moving the lenslet array and the holographic optical element instead of the sample (see FIG. 6). This only solves half of the problem but does not address the fact that the sample needs to be moved to a different reading position. As shown in FIG. 23, in an embodiment the reference 800 and object beam 810 interfere at the holographic recording material 820 position. A reading light source 840 positioned on the other side of the material emits a light beam 850 directed toward the material. The reading beam goes through the material, gets reflected by a mirror 860, and then is diffracted to reconstruct the hologram beam 870 toward the viewer direction. In order to let the writing beam pass through the mirror 860, an aperture 830 the size of the hogel 880 is made in the mirror. The mirror has the dual-function to act as a mask to precisely define the area on the material written by the write beam. Note that there could be multiple apertures for writing multiple hogels. A translation stage 885 moves the mirror, and more particularly aperture 830 in synchronization with the steering of the write beams to record the next hogel. The sample and the reading source do not need to move.

To prevent some light from the reading source to be seen by the viewer and potentially harm him, a wavelength selective device 890 can be put between the sample and the viewer to absorb or reflect the transmitted light from the writing beams. This can be achieved by an absorption filter, dielectric coating . . . . In this case the writing and reading wavelength should be different enough to be respectively transmitted and absorbed by the device.

In previous integral holographic setups (FIG. 9), erasing the previously recorded hologram was done with an independent part of the setup. A separate erase beam illuminates the entire holographic recording material to remove the previously recorded image so a new hologram can be recorded. This erasing function is important so there is no ghost image when a new hologram is displayed. Unfortunately erasing takes some time that is not compatible with a fast refreshing rate required by telepresence or other application. Erasing also required the material to be moved to another position to be illuminated by the erasing beam. This is not compatible with the scanning method for telepresence and other applications, the holographic recording material must remain static when the audience is looking at it, so the holographic recording material cannot move.

An approach to overcome this problem is to use the writing beam as the erasing beam. The writing beam simultaneously erases the previous hologram encoded into a hogel (line or line segment) and writes the current hologram. Based on the diffraction efficiency of the material, the power and intensity ratio of the write laser are tuned so that the writing beam completely erases the previous hologram (i.e. no ghost image) without creating a permanent set to the current hologram. If the power/intensity is too low, the beam will not completely erase the previous hologram. If the power/intensity is too high, the beam may permanently write the current hologram into the material so that it cannot be erased.

Figure 24:
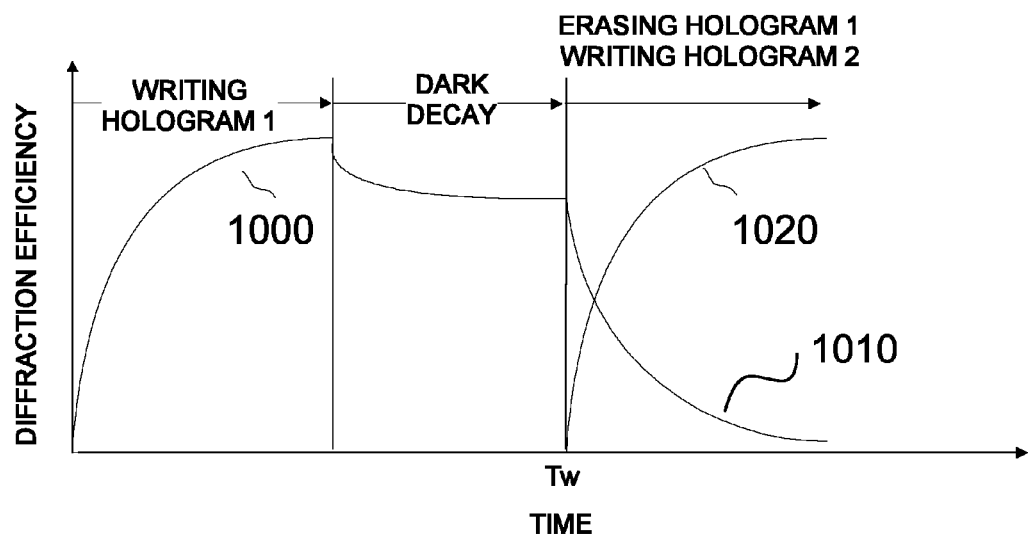
FIG. 24 is a diagram of simultaneous erasing and writing of a hogel in accordance with an embodiment of the invention.

As shown in FIG. 24, in photorefractive media, the hologram diffraction efficiency 1000 rises according to the writing time and then decay when the writing beams are turned off (e.g. dark decay). When the erasing light illuminates the hologram, the diffraction efficiency decreases according to time 1010. To simultaneously write a new hologram and erase the old one, the writing beams of the second hologram are used to erase the first hologram. The efficiency of the second hologram 1020 rises when the efficiency of the first hologram 1010 decreases. In order to avoid any ghost image from the first hologram when replacing the second hologram, the first hologram efficiency should be at a minimum value compared to the efficiency of the second hologram (lower than 20%) when the recording is done. This technique can be applied to each single hogel in the case of integral holography.

For accurate reproduction of the 3D image in HPO (Horizontal-Parallax Only) geometry, the horizontal and vertical image plans need to be dissociated during the holographic recording. The best resolution happens when the vertical image plane is at the holographic recording material position and the horizontal image plane is near the Fourier cylindrical lens position.

Figure 25:
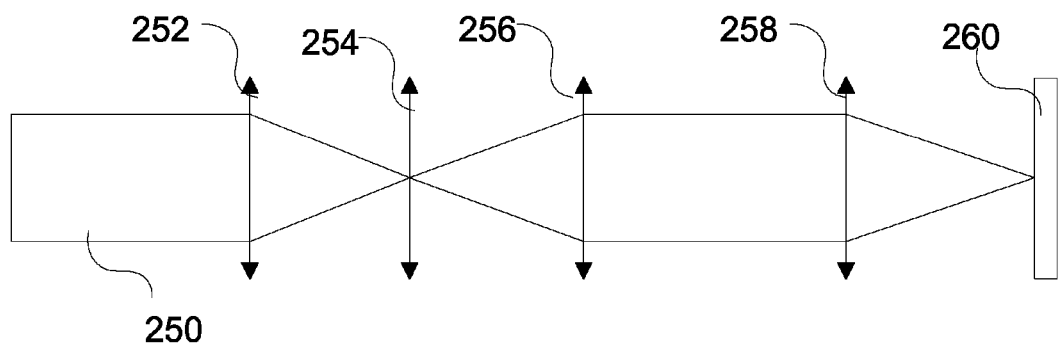
FIGS. 25 and 26 are diagrams of a reflective off-axis telescope for resolution improvement in a horizontal parallax only (HPO) geometry in accordance with an embodiment of the invention.

As shown in FIG. 25, the separation of object beam 250 image planes has always been done in the holographic recording setup by using a cylindrical lens 254 at the focal point of an imaging system constituted of two cylindrical lenses 252 and 256. By carefully choosing the focal length of the lenses, the horizontal image plane is near the Fourier cylindrical lens 258 and the vertical image plane is near the holographic recording material 260. However, lens 254 provides a fixed separation of the image planes, which sometimes is difficult to match with the lens 258 parameters. Besides, large objective lenses in the refractive telescope (252 and 256) are usually associated with strong spherical aberrations and aberration-free large size objectives are extremely expensive.

In an embodiment, the cylindrical lenses are replaced with a reflective off axis telescope system composed of a spherical lens or combination of some, along with a spherical concave mirror. Concave mirrors are characterized by minimal spherical aberrations and are relatively inexpensive in large sizes compared to lenses.

Figure 26:
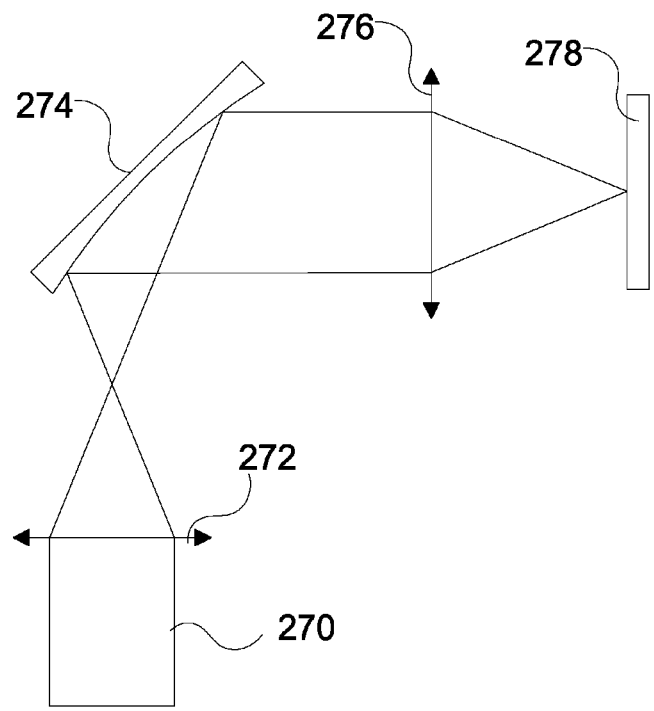

Usually, a reflective telescope induces a lot of image astigmatism since it should be used in off-axis geometry to eliminate image obstruction by the input lenses. This fact is turned to advantage. The natural astigmatism provides the required separation of the image planes. FIG. 26 shows how the object beam 270 is shaped by a spherical lens 272 and then collimated with a spherical mirror 274 at an angle. The natural astigmatism of the spherical mirror 274 used at an angle is used to dissociate the image plane so the horizontal image plane is near the Fourier cylindrical lens 276 and the vertical image plane is near the holographic recording material 278.

Advantages provided by such a system are minimal spherical aberrations for even large size holograms, the separation of image plane can be continuously tuned according to the orientation of the spherical mirror, and this system is relatively inexpensive.

Photorefractive polymer material needs an external applied field to generate the index modulation upon illumination. This is due to the charge transport mechanism. Moreover, the grating vector must have a component parallel to the field in order to drive charge from the bright regions where they are generated to the dark regions so they can be trapped.

Figure 27:
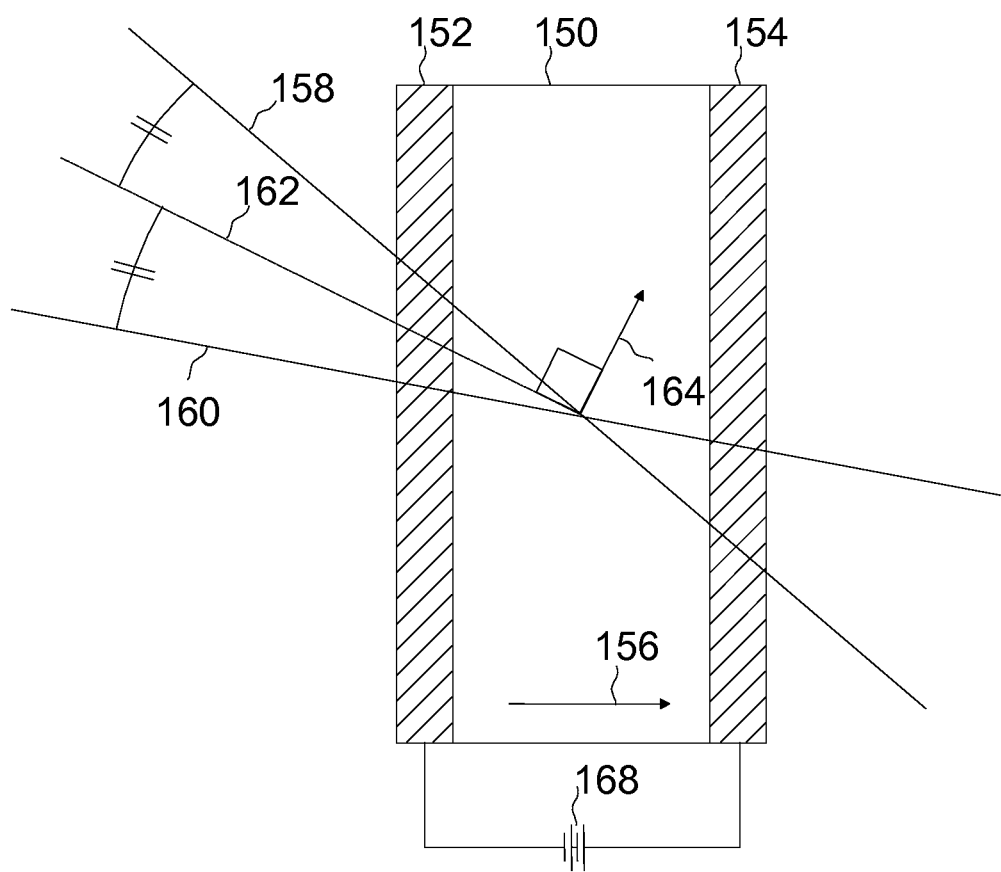
FIGS. 27, 28 and 29 are diagrams of an interleaved electrode for external field application in photorefractive polymer material in accordance with an embodiment of the invention.

Usually, as shown in FIG. 27, the field is applied by the means of a ground electrode 152 and a hot electrode 154 deposited on opposing surfaces of the photorefractive film 150 (field direction does not matter). Electrodes are electrically connected to a DC voltage supply 168. The field vector 156 is perpendicular to the film surface. To have a grating component along the electrical field direction, in a transmission hologram configuration, the sample is tilted according to the recording beam bisector 162. One talks of a slanted geometry; 158 and 160 are the recording beams and 164 is the grating vector (perpendicular to the beam bisector 162 inside the material). The index of refraction was not taken into account in the drawing for the sake of clarity.

Figure 28:
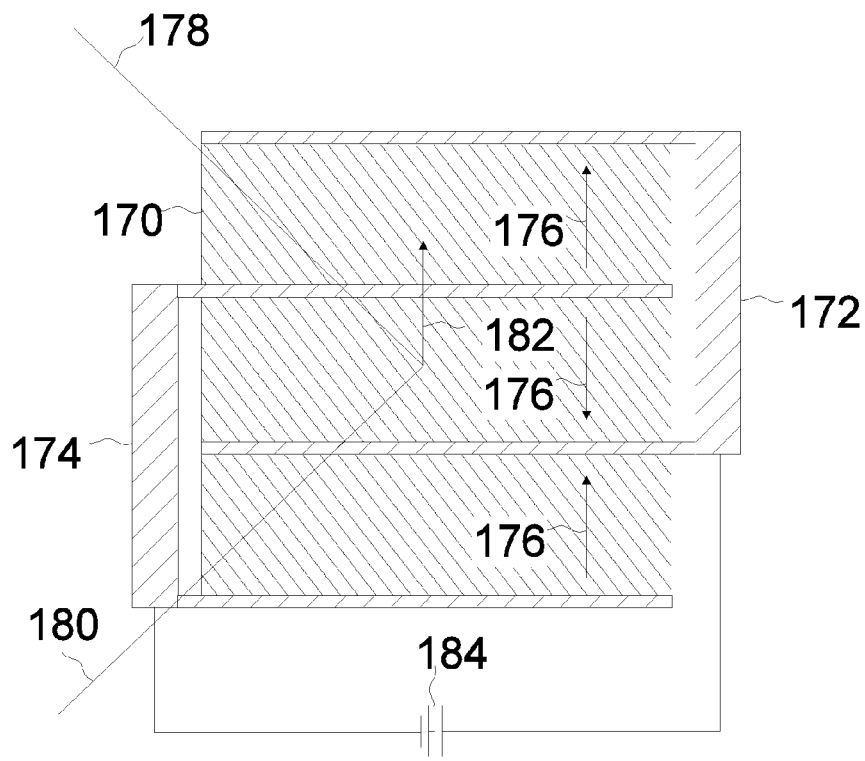
Figure 29:
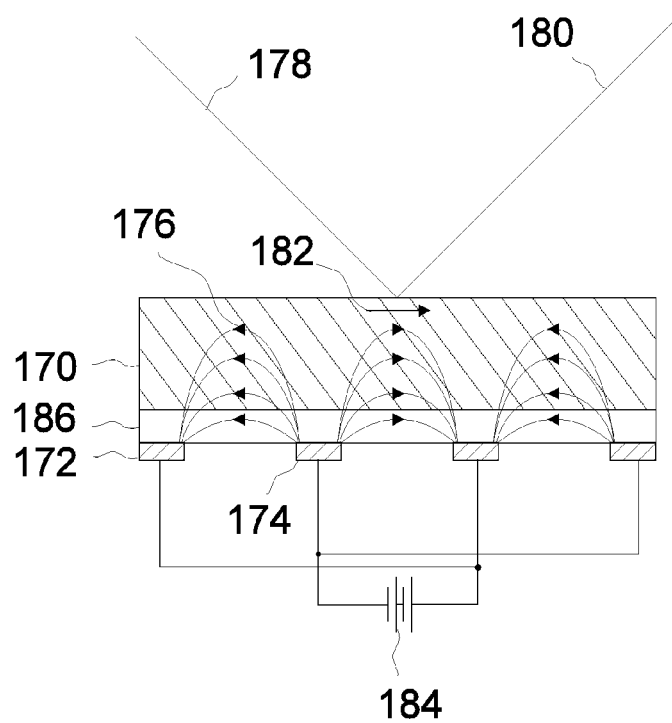

In an embodiment, an interleaved electrode pattern is deposited on only one side of the sample. This geometry is described in FIG. 28 and FIG. 29 where two interleaved electrodes 172 and 174 are deposited on the top of the sample 170. Electrodes are connected to a DC voltage supply 184. The space between the electrodes, their width and length, as their number can vary according to the desired field intensity and the PR film size. With such a pattern, the orientation of the electric field is parallel to the sample surface if the sample is thin compared to the space between the electrodes. The direction of the field does not matter. If the plane of incidence (plane comprising both writing beams) has a component parallel to the field vectors 176, the grating vector 182 will also have a component along the electric field and the photorefractive effect should happen. As shown in FIG. 29, a passive layer of dielectric material 186 can also be coated between the electrodes and the PR polymer material as a buffer layer to prevent charges from the PR material to directly contact the electrode.

In another embodiment, an interleaved electrode pattern is placed in between two layers of photorefractive material. This can be done by depositing a first layer of PR material on a substrate then coating and etching the electrodes on the top of it and finally placing a second layer of PR material on the top of the electrodes. The advantage of that configuration is that the electric field is symmetrical in regard of the electrode plan; so the field on the top as the field on the bottom of the electrode plan will participate to the PR effect doubling the diffraction efficiency of the device. A passive layer of dielectric material can also be coated between the electrodes and the PR polymer material as a buffer layer to prevent charges from the PR material to directly contact the electrode and reduce the change of electrical shortcut inside the PR material.

Advantages of this geometry are multiple. The field intensity can be varied according to the electrode geometry. There is only one side of the sample that has electrodes. If the plane of incidence of the writing beams is exactly perpendicular to the electric field, the grating vector is also exactly perpendicular to the electric field that should enhance the material index modulation and improve the diffraction efficiency. This configuration cannot be achieved with the slanted transmission geometry.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A holographic recording system, comprising:
a holographic recording material comprising a photorefractive (PR) polymer;
an electrode structure for receiving a voltage to apply an external electric field to the PR polymer;
a laser that produces a coherent beam;
a beam splitter that splits the coherent beam into an object beam and a reference beam, the intensity of the object beam is spatially structured with data for writing a hologram to form a modulated object beam;
a beam steering mechanism that steers the modulated object beam and the reference beam relative to the holographic recording material to interfere at different places in the material to record one or more holograms, said modulated object beam and said reference beam producing a grating vector at an angle to the external electric field that controls a diffraction efficiency of the PR polymer;
a first lens array that focuses the object beam on the recording material at multiple positions, said object beam spatially structured so that each position on the recording material corresponds to correct hologram data;
a second lens array that splits the reference beam into multiple reference beams that are directed to the first lens array that collimates the multiple reference beams so that the multiple object and multiple reference beams interfere at the multiple positions on the material to write multiple holograms simultaneously; and
a first holographic optical element (HOE) that diffracts one of the object or reference beams to reduce the angle between the grating vector and the external electric field and increase the diffraction efficiency of the PR polymer.

2. The holographic recording system of claim 1, wherein the first HOE is configured to allow one of the object or reference beams to pass there through unaffected and to diffract the other one of the object or reference beams.

3. The holographic recording system of claim 1, wherein the second lens array is a second HOE comprising an angularly selective grating.

4. The holographic recording system of claim 1, further comprising:
a second holographic optical element (HOE) that focuses the object beam on the recording material at multiple positions, said object beam spatially structured so that each position corresponds to the correct hologram data;

wherein said first HOE splits by diffraction the reference beam into multiple reference beams that are directed to the second HOE that collimates the multiple reference beams so that the multiple object and multiple reference beams interfere at the multiple positions on the material to write multiple holograms simultaneously.

5. The holographic recording system of claim 1, wherein the hologram is recorded using integral holography to form a display, further comprising:
a reading beam that is diffracted by the holographic recording material at an angle; and
a second holographic optical element (HOE) positioned after the recording material to redirect the diffracted beam approximately orthogonal to the recording material toward a viewer position.

6. The holographic system of claim 1, wherein said object and reference beams interfere at multiple positions that are spaced apart on an x-y grid, said beam steering mechanism translating the first and second lens arrays along a single axis at an oblique angle to the x-axis to write multiple holograms over the entire surface of the recording material as a series of parallel rows.

7. The holographic recording system of claim 1, in which a color hologram is recorded using integral holography in a transmission geometry, further comprising:
a spatial light modulator (SLM) having different zones loaded with hogel data for different colors to spatially structure the object beam and form the modulated object beam; and
a focusing lens that redirects the different zones of the modulated object beam at correct angles of incidence for each color towards the recording material such that transmission of a color reading beam through the recording material produces multiple object beams at different colors that superimpose at a common viewer position.

8. The holographic recording system of claim 1, in which the system uses integral holography in a full-parallax transmission geometry to record and display holograms, further comprising:
a mask/mirror positioned between the laser and the holographic recording material, said mask/mirror comprising an aperture that defines the extent of an individual hogel in the hologram and a mirror surface facing the recording material;
a translation stage that moves the mask/mirror to synchronize a position of the aperture with the location of the steered object and reference beams; and
a read source positioned on the opposite side of the recording material to direct a reading beam through the material where the reading beam reflects off the mirrored surface and is transmitted back through the hologram in the material where the reading beam is diffracted to produce a diffracted beam to display the hologram.

9. The holographic recording system of claim 1 for the display of holograms in a horizontal parallax only (HPO) geometry in which horizontal and vertical image planes need to be disassociated during the holographic recording, further comprising:
a spherical lens that shapes the object beam; and
a spherical mirror positioned at an angle to the object beam, astigmatism of the spherical mirror disassociating an image plane so a horizontal image plane is near a Fourier cylindrical lens and a vertical image plane is near the holographic recording material.

10. The holographic recording system of claim 1 for recording of a color holographic stereogram in a transmission geometry, further comprising:
a first optical system to separate the coherent beam into the reference and object beams having both first and second orthogonal polarization components; and
a second optical system to split the object beam into first, second and third object beams, said first and second object beams having said first polarization component and said third object beam having said second polarization component, said first and second object beams positioned to have a symmetrical angle of incidence so that the grating vector of a hologram formed by cross-talk is perpendicular to the external electric field in the photorefractive material so that the diffraction efficiency is near zero;
wherein angles of incidence for all three object beams satisfy a Bragg equation so that when each hologram is read with a different color it displays a full color hologram in a direction of an audience.

11. The holographic recording system of claim 1, wherein the object beam is used to simultaneously erase the structure of a previous hologram and write a current hologram, the laser power being sufficiently high to erase the previous hologram without leaving a ghost image and low enough to record the current hologram without causing a permanent set.

12. The holographic recording system of claim 11, wherein the object beam reduces the diffraction efficiency of the previous hologram to less than 20% when writing the current hologram.

13. The holographic recording system of claim 1, wherein the electrode structure comprises a pair of interleaved electrodes deposited on only one surface of the PR polymer.

14. A holographic recording system, for recording a hologram using integral holography for a display, comprising:
a holographic recording material comprising a photorefractive (PR) polymer;
an electrode structure for receiving a voltage to apply an external electric field to the PR polymer;
a laser that produces a coherent beam;
a beam splitter that splits the coherent beam into an object beam and a reference beam, the intensity of the object beam is spatially structured with data for writing a hologram to form a modulated object beam;
a beam steering mechanism that steers the modulated object beam and the reference beam relative to the holographic recording material to interfere at different places in the material to record one or more holograms, said modulated object beam and said reference beam producing a grating vector at an angle to the external electric field that controls a diffraction efficiency of the PR polymer;
a first holographic optical element (HOE) that diffracts one of the object or reference beams to reduce the angle between the grating vector and the external electric field and increase the diffraction efficiency of the PR polymer;
a second holographic optical element (HOE) that focuses the object beam on the recording material at multiple positions, said object beam spatially structured so that each position corresponds to the correct hologram data, wherein said first HOE splits by diffraction the reference beam into multiple reference beams that are directed to the second HOE that collimates the multiple reference beams so that the multiple object and multiple reference beams interfere at the multiple positions on the material to write multiple holograms simultaneously; and
a third holographic optical element (HOE) positioned after the recording material to redirect a reading beam transmitted through the recording beam approximately orthogonal to the recording material toward a viewer position.

* * * * *